(12) United States Patent  (10) Patent No.: US 8,384,669 B2
Katayama et al.  (45) Date of Patent: Feb. 26, 2013

(54) INFORMATION PROCESSING APPARATUS, REMOTE SYSTEM, AND COMPUTER READABLE MEDIUM

(75) Inventors: Shinichi Katayama, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1133 days.

(21) Appl. No.: 12/292,531

(22) Filed: Nov. 20, 2008

(65) Prior Publication Data

US 2009/0128491 A1 May 21, 2009

(30) Foreign Application Priority Data

Nov. 21, 2007 (JP) ................................. 2007-302277
Nov. 13, 2008 (JP) ................................. 2008-291570

(51) Int. Cl.
  *G06F 3/033* (2006.01)
(52) U.S. Cl. ...................................... 345/163; 345/156
(58) Field of Classification Search .................. None
  See application file for complete search history.

(56) References Cited

U.S. PATENT DOCUMENTS

| | | | |
|---|---|---|---|
| 5,883,617 | A | 3/1999 | Yoshikawa |
| 6,098,184 | A | 8/2000 | Patterson, Jr. |
| 6,256,014 | B1 | 7/2001 | Thomas et al. |
| 7,747,702 | B2 * | 6/2010 | Anderson et al. ............ 709/219 |
| 2004/0021645 | A1 | 2/2004 | Kobayashi et al. |
| 2004/0123001 | A1 | 6/2004 | Kikuchi et al. |
| 2005/0007344 | A1 | 1/2005 | Cook et al. |
| 2005/0190148 | A1 | 9/2005 | Fujita |
| 2007/0013656 | A1 | 1/2007 | Shirley |
| 2007/0074179 | A1 | 3/2007 | Kwan |

FOREIGN PATENT DOCUMENTS

| | | |
|---|---|---|
| EP | 1016952 | 7/2000 |
| JP | 05-094258 | 4/1993 |
| JP | 7-261914 | 10/1995 |
| JP | 11-085397 | 3/1999 |
| JP | 11-110134 | 4/1999 |
| JP | 11-110136 | 4/1999 |
| JP | 01/84291 A1 | 11/2001 |
| JP | 2003-534685 | 11/2003 |
| KR | 1020060092507 | 8/2006 |
| WO | 01/15130 | 3/2001 |

(Continued)

OTHER PUBLICATIONS

Korean Patent Abstracts, Publication No. 1020060092507, Published Aug. 23, 2006.

(Continued)

*Primary Examiner* — Muhammad N Edun
(74) *Attorney, Agent, or Firm* — Staas & Halsey LLP

(57) ABSTRACT

An information processing apparatus includes a mouse driver that adds a second data to a first data showing a movement distance of a mouse cursor, and transmits the combined data to an OS. The information processing apparatus has: an input portion that inputs the first data from an external device via a KVM switch, and a flag showing effectiveness or invalidation of adding the second data to the first data; and a controlling portion that transmits the first data input to the input portion to the mouse driver, and when the flag shows invalidation of addition of the second data, the controlling portion interrupting between the mouse driver and the OS, acquiring the combined data, removing the second data from the combined data, and transmitting the first data to the OS.

16 Claims, 15 Drawing Sheets

FOREIGN PATENT DOCUMENTS

WO  2006-088332  8/2006

OTHER PUBLICATIONS

Office Action issued in Korean Application No. 10-2008-116517 dated Jul. 28, 2010.
European extended Search Report dated Jan. 14, 2010 in European Application No. 08169542.1.
Patent Abstracts of Japan, Publication No. 7-261914, Publication Date Oct. 13, 1995.
Patent Abstracts of Japan, Publication No. 11-085397, Publication Date Mar. 30, 1999.
Patent Abstracts of Japan, Publication No. 11-110134, Publication Date Apr. 23, 1999.
Patent Abstracts of Japan, Publication No. 05-094258, Publication Date Apr. 16, 1993.
Patent Abstracts of Japan, Publication No. 11-110136, Publication Date Apr. 23, 1999.
Partial European Search Report issued on Mar. 4, 2009 in corresponding European Patent Application 08169542.1.
Extended European Search Report dated Jan. 7, 2011 in Application No. 10188247.0.
European Search Report in Application No. 10188248.8 dated Jan. 31, 2011.

* cited by examiner

MOUSE PACKET

MOUSE PACKET

MOUSE PACKET

INFORMATION PROCESSING APPARATUS, REMOTE SYSTEM, AND COMPUTER READABLE MEDIUM

BACKGROUND OF THE INVENTION

1. Field of the Invention

The present invention relates to an information processing apparatus which is connected to a client via a KVM (K:keyboard, V:video, M:mouse) switch, as well as a remote system, and a computer readable medium.

2. Description of the Related Art

Conventionally, there has been known a system which includes a plurality of clients, a plurality of servers, a KVM switch switching communication between the clients and the servers (see Japanese Patent Application Publication No. 2003-534685).

In this type of system, one client is connected to a server selected by a user via the KVM switch, and screen data of the server can be displayed on a monitor connected to the client. By operating a mouse connected to the client, the user of the client can move a mouse cursor displayed on the screen data of the server.

However, when the user of the client operates the mouse connected to the client to move the mouse cursor displayed on the screen data of the server, the mouse cursor might move more than the imagination of the user.

This is because the server adds a movement amount of the mouse cursor based on a movement speed or a movement acceleration to a movement amount of the mouse cursor which is received from the client, and shown by relative coordinates.

A certain type of software has a function to move the mouse cursor to a specific GUI (Graphical User Interface) by a specific event. There is a mouse property (concretely, a setting of "a pointer is automatically moved on a predetermined button") of Windows OS (operating system) of Microsoft Corporation as this type of software. When this type of software is installed in the server, and the function is effective, the mouse cursor displayed on the screen data of the server is moved by a specific event of opening an application on which the GUI is displayed. In this case, a position of the mouse cursor which is displayed on the screen data of the server and is presumed by the client, and an actual position of the mouse cursor displayed on the screen data of the server might become misaligned.

SUMMARY OF THE INVENTION

It is an object of the present invention to provide an information processing apparatus, a remote system, and a computer readable medium which can move a mouse cursor at a correct position by remote control without being affected by a movement speed or a movement acceleration of a mouse.

According to a first aspect of the present invention, there is provided an information processing apparatus including: a mouse driver that adds a second relative coordinate value data to a first relative coordinate value data showing a movement distance and a movement direction of a mouse cursor, and transmits the combined relative coordinate value data to an operating system; an input portion that inputs the first relative coordinate value data from an external device via a KVM switch, and a flag showing effectiveness or invalidation of adding the second relative coordinate value data to the first relative coordinate value data; and a controlling portion that transmits the first relative coordinate value data input to the input portion to the mouse driver, and when the flag shows invalidation of addition of the second relative coordinate value data, the controlling portion interrupting between the mouse driver and the operating system, acquiring the combined relative coordinate value data, removing the second relative coordinate value data from the combined relative coordinate value data, and transmitting the first relative coordinate value data to the operating system.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

First Embodiment

Figure 1:
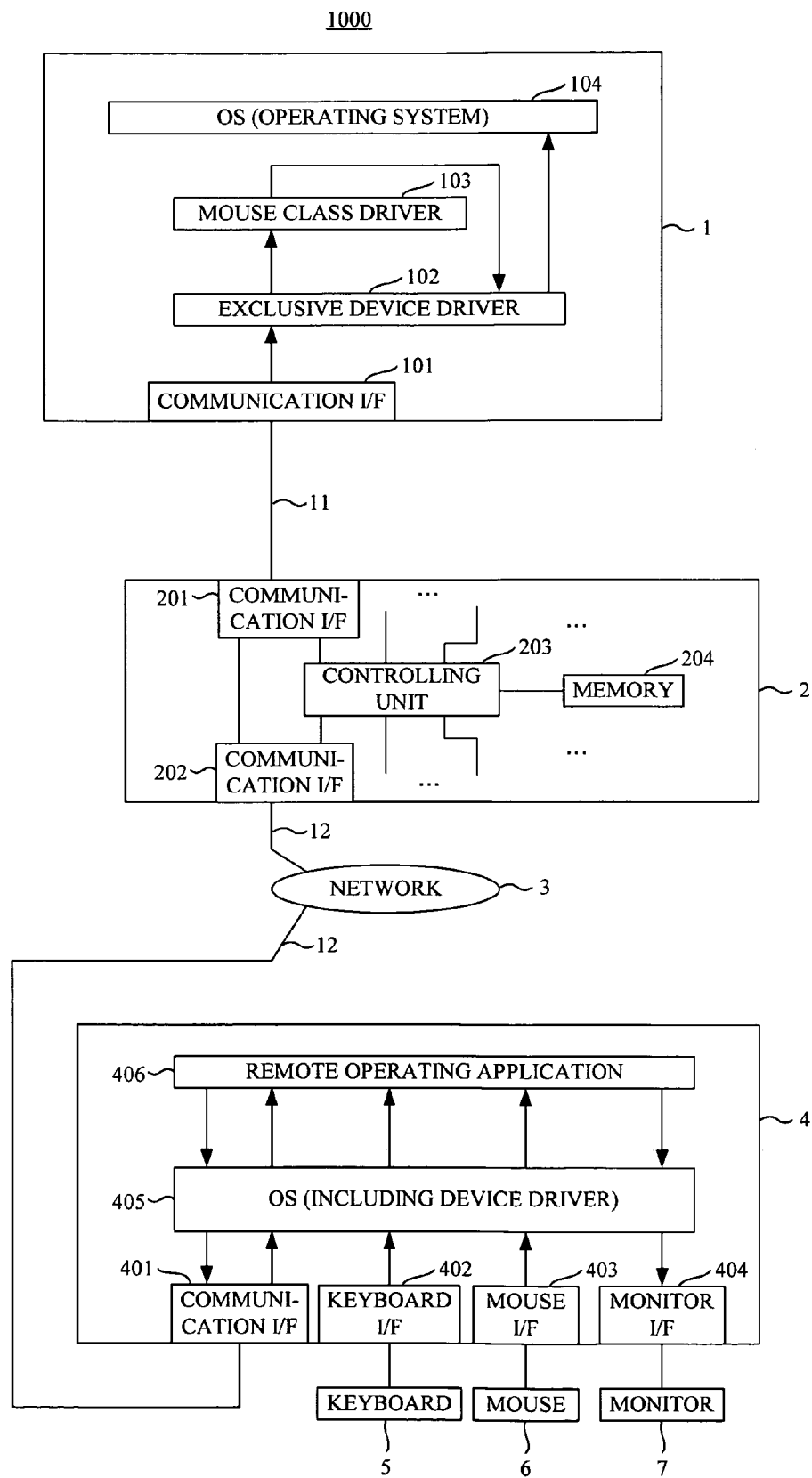
FIG. 1 is a schematic diagram showing a remote system including an information processing apparatus according to a first embodiment.

FIG. 1 is a schematic diagram showing a remote system including an information processing apparatus according to a first embodiment.

In FIG. 1, a remote system 1000 includes a server 1 as an information processing apparatus, a KVM switch 2, and a client 4 as an external device. The server 1 is connected to the KVM switch 2 via a serial cable 11. The client 4 is connected to the KVM switch 2 via a network 3 and LAN cables 12.

Although the remote system 1000 includes the server 1 and the client 4 in FIG. 1, the remote system 1000 may include a plurality of servers and clients.

The server 1 includes: a communication interface (I/F) 101 to which the serial cable 11 is connected; an exclusive device driver 102 that extracts cursor movement amount data indicative of a movement amount and a movement direction of a mouse cursor and button data indicative of whether a button of a mouse is depressed, from a packet received from the KVM switch 2, outputs the extracted cursor movement amount data and the extracted button data to a mouse class driver 103, and interrupts between the mouse class driver 103 and an operating system (OS) 104 to acquire the cursor movement amount data and the button data output from the mouse class driver 103; the mouse class driver 103 that adds a cursor movement amount by an acceleration/speed process to the cursor movement amount data acquired by the exclusive device driver 102; the operating system (OS) 104 that moves the mouse cursor based on the cursor movement amount data received from the exclusive device driver 102. Although the OS 104 is Windows (registered trademark), UNIX (registered trademark), MAC OS, or the like, the Windows is mainly used for the present embodiment.

The acceleration/speed process means a process that adds the movement amount of the mouse cursor based on a movement speed or a movement acceleration of the mouse to the movement amount of the mouse cursor which the server 1 receives from the client 4 via the KVM switch 2, and is shown by relative coordinates.

The KVM switch 2 includes: a communication I/F 201 that receives screen data from the server 1 via the serial cable 11, and transmits the packet including the cursor movement amount data and the button data to the server 1; a communication I/F 202 that receives absolute coordinate values of the mouse cursor and a key code from the keyboard 5, from the client 4, and transmits the screen data from the server 1 to the client 4; a controlling unit 203 that executes various kinds of processes, and controls the entire device including the communication I/Fs 201 and 202; and a memory 204 that stores various kinds of data. The controlling unit 203 is composed of a microcomputer, and the memory 204 is composed of a hard disk drive or a nonvolatile memory. Also, the KVM switch 2 is an IP-KVM switch that communicates the absolute coordinate values of the mouse cursor, the key code from the keyboard 5, the screen data from the server 1 as data of an IP packet to and from the client 4.

Each of the communication I/F 201 and the communication I/F 202 is not limited to a single communication I/F, and two or more numbers of communication I/F may be included in the KVM switch 2 as the communication I/F 201 or the communication I/F 202.

The client 4 includes: a communication I/F 401 that transmits the absolute coordinate values of the mouse cursor and a key code from the keyboard 5 to the KVM switch 2 via the network 3, and receives the screen data of the server 1 from the KVM switch 2 via the network 3; a keyboard I/F 402 that receives the key code from the keyboard 5; a mouse I/F 403 that receives mouse data from the mouse; a monitor I/F 404 that outputs the screen data of the server 1 to the monitor 7; an OS 405 that includes a plurality of device drivers controlling the keyboard 5, the mouse 6, and the monitor 7; and a remote operating application 406 that causes the monitor 7 to display the screen data of the server 1 and executes remote operation.

The OS 405 receives the screen data of the server 1 from the communication I/F 401 and outputs the screen data of the server 1 to the remote operating application 406. Also, the OS 405 receives the key code from the I/F keyboard 402, outputs the key code to the remote operating application 406. Further, the OS 405 receives the mouse data from the mouse I/F 403, and outputs the absolute coordinate values of the mouse cursor to the remote operating application 406 based on the absolute coordinate values. The OS 405 receives the key code from the remote operating application 406 and the absolute coordinate values of the mouse cursor, and outputs them to the communication I/F 401.

Figure 2A:
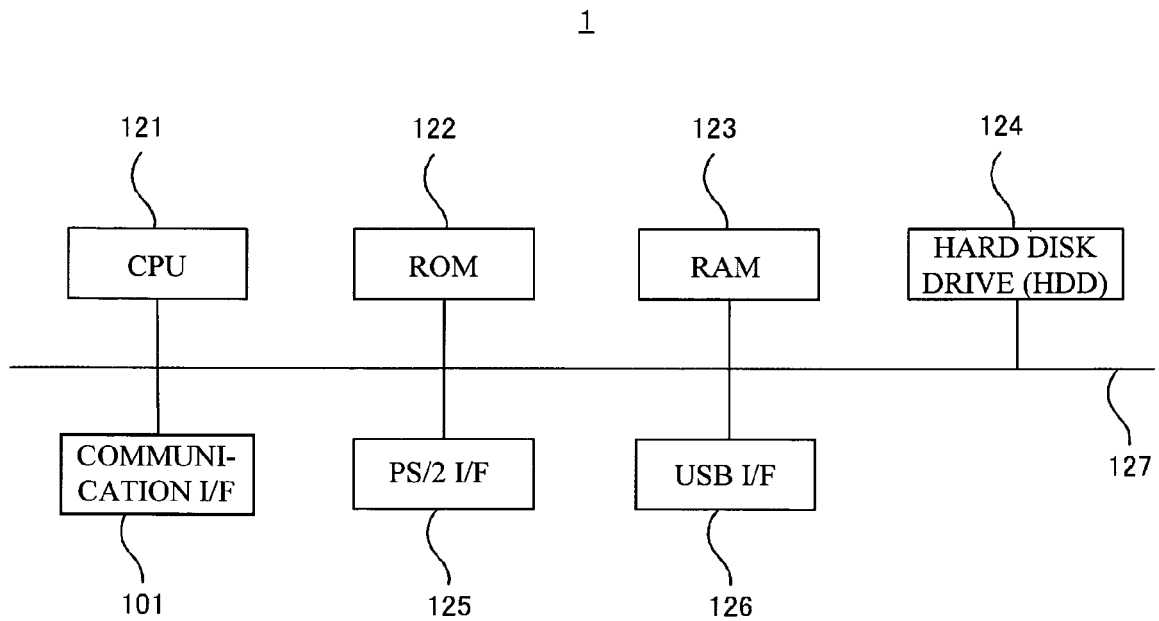
FIG. 2A is a block diagram showing the configuration of a server 1.
Figure 2B:
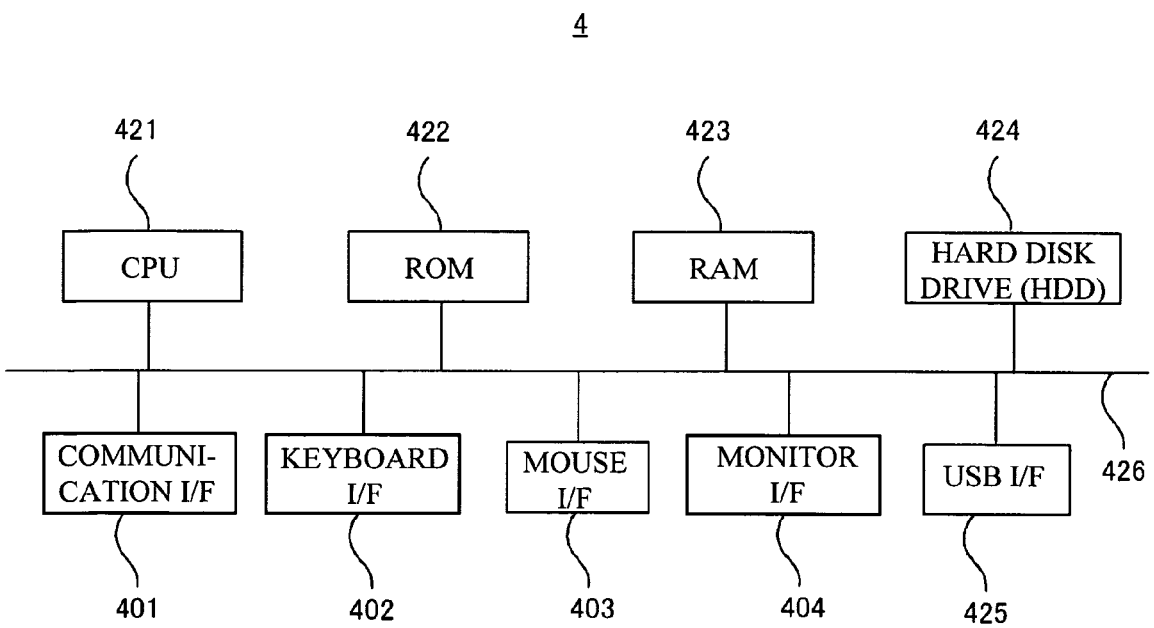
FIG. 2B is a block diagram showing the configuration of a client 4.

FIG. 2A is a block diagram showing the configuration of the server 1, and FIG. 2B is a block diagram showing the configuration of the client 4.

The server 1 includes: the communication I/F 101; a CPU 121 that controls the entire server; a ROM 122 that has a control program; a RAM 123 that functions as a working area; a hard disk drive (HDD) 124 that has the exclusive device driver 102, the mouse class driver 103, the OS 104, and various kinds of information and programs; a PS/2 interface 125; and a USB (Universal Serial Bus) I/F 126 that connects a USB device, not shown. The CPU 121 is connected to the communication I/F 101, the ROM 122, the RAM 123, the HDD 124, the PS/2 interface 125, and the USB I/F 126 via a system bus 127.

The CPU 121 arbitrarily reads out the exclusive device driver 102, the mouse class driver 103, or the OS 104 from the HDD 124, and executes it, so that a process executed by the exclusive device driver 102, the mouse class driver 103, or the OS 104 is achieved.

The client 4 includes: the communication I/F 401; the keyboard I/F 402; the mouse I/F 403; the monitor I/F 404; a CPU 421 that controls the entire client; a ROM 422 that has a control program; a RAM 123 that functions as a working area; a hard disk drive (HDD) 424 that has the OS 405, the remote operating application 406, and various kinds of information and programs; and a USB I/F 425 that connects a USB device, not shown. The CPU 421 is connected to the communication I/F 401, the keyboard I/F 402, the mouse I/F 403, the monitor I/F 404, the ROM 422, the RAM 423, the HDD 424, and the USB I/F 425 via a system bus 426.

The CPU 421 arbitrarily reads out the OS 405 or the remote operating application 406 from the HDD 424, and executes it, so that a process executed by the OS 405 or the remote operating application 406 is achieved.

Figure 3A:
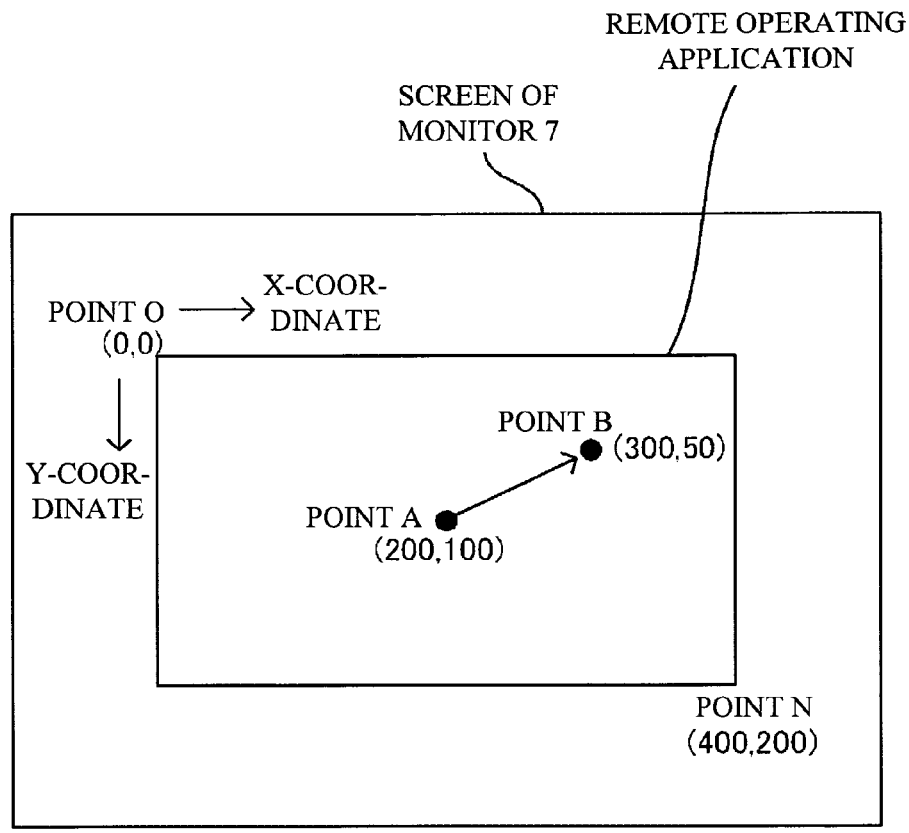
FIG. 3A is a block diagram showing an example of a screen of a monitor 7 which displays a remote operating application 406.
Figure 3B:
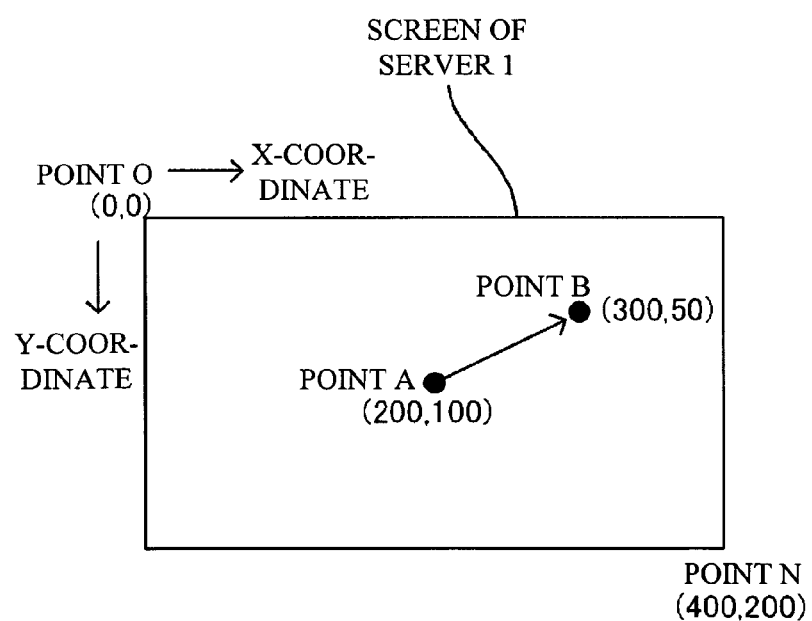
FIG. 3B is a block diagram showing an example of a screen of the server 1.

FIG. 3A is a block diagram showing an example of a screen of the monitor 7 which displays the remote operating application 406, and FIG. 3B is a block diagram showing an example of a screen of the server 1.

As shown in FIG. 3A, the screen of the server 1 is displayed on the remote operating application 406. When a user of the server 1 moves the mouse cursor on the remote operating application 406, the mouse cursor on the screen of the server 1 moves. In FIGS. 3A and 3B, the mouse cursors are indicated by black points.

It is assumed in FIGS. 3A and 3B that each of upper left ends of the remote operating application 406, and the screen of the server 1 is an original point (a point "O"), and each of lower right ends thereof is a point "N". Further, it is assumed that the coordinates of the point "O" is indicated by (0, 0), and the coordinates of the point "N" is indicated by (400, 200).

In the following description, it is considered that the mouse cursor is placed at the coordinates of the point "A" (200, 100) in an initial state, and a user of the client 4 moves the mouse cursor to the coordinates of the point "B" (300, 50) by operating the mouse 6.

It should be noted that the coordinates of the point "O" (0, 0), the coordinates of the point "N" (400, 200), the coordinates of the point "A" (200, 100), and the coordinates of the point "B" (300, 50) are all the absolute coordinate values, i.e., absolute coordinate value data.

Figure 4:
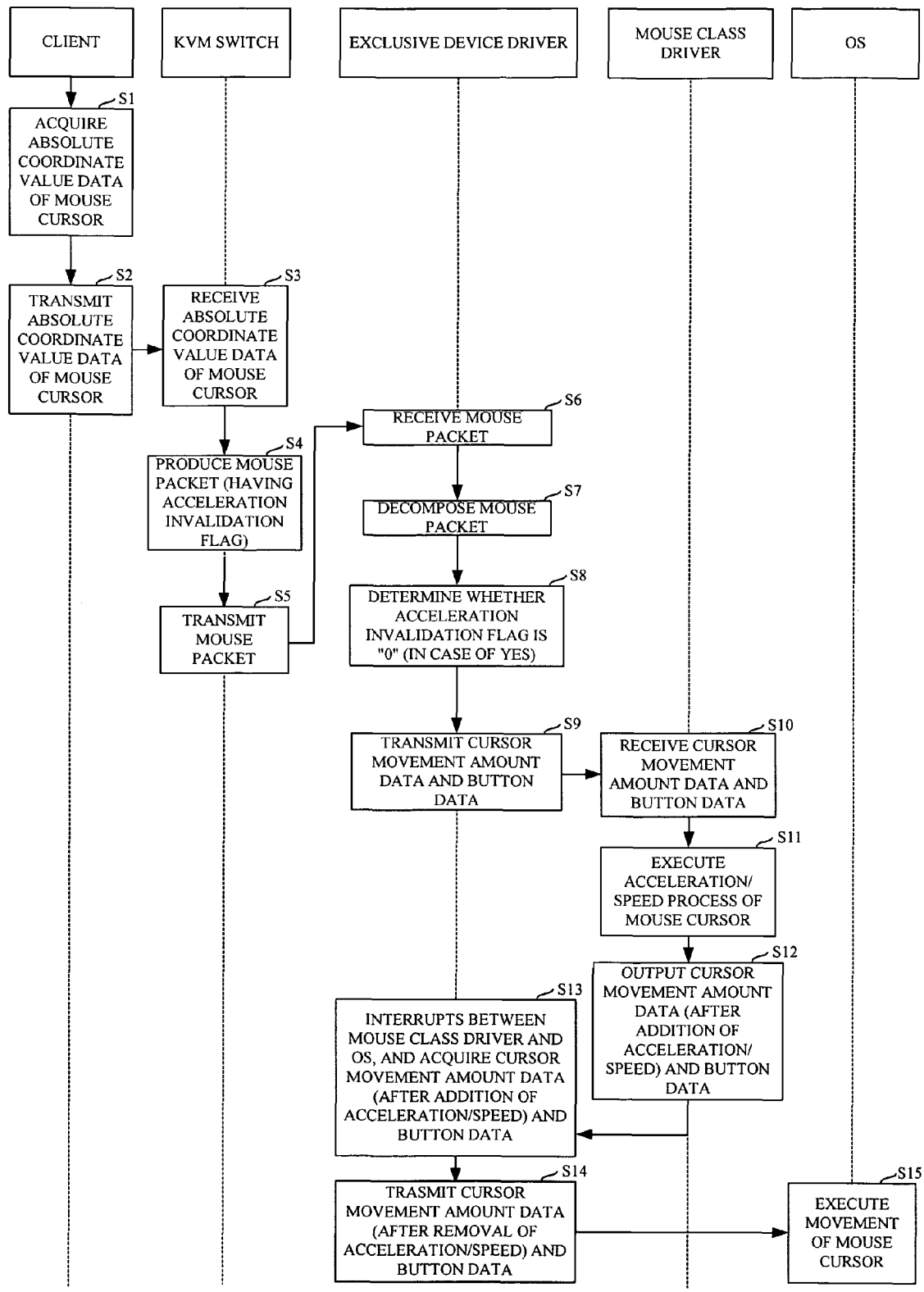
FIG. 4 is a diagram showing a process sequence executed by the client 4, a KVM switch 2, and the server 1.

FIG. 4 is a diagram showing a process sequence executed by the client 4, the KVM switch 2, and the server 1.

As a premise of the process sequence, the coordinates of the point "A" (200, 100) (absolute coordinate value data) are previously stored into the memory 204 of the KVM switch 2.

The CPU 421 executing the remote operating application 406 of the client 4 acquires the absolute coordinate value data of the mouse cursor (step S1), and transmits the acquired absolute coordinate value data of the mouse cursor to the KVM switch 2 (step S2). Here, it is considered that the mouse cursor is moved from the coordinates of the point "A" (200, 100) to the coordinates of the point "B" (300, 50), and the CPU 421 therefore transmits the coordinates of the point "B" (300, 50) to the KVM switch 2. At this time, if the button of the mouse 6 is depressed (clicked), the CPU 421 transmits the button data indicative of the depressed button and depressing the button to the KVM switch 2.

The controlling unit 203 receives the absolute coordinate value data of the mouse cursor from the client 4 (step S3). Here, the controlling unit 203 receives the coordinates of the point "B" (300, 50). Further, when the button data is transmitted, the controlling unit 203 additionally receives the button data.

Figure 5:
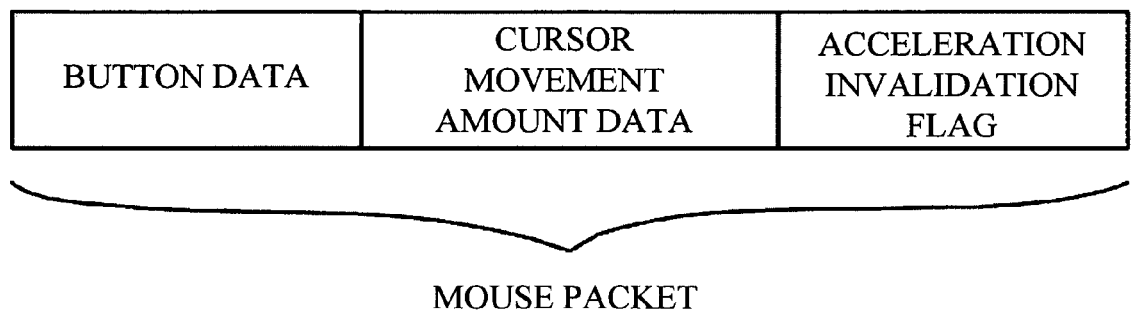
FIG. 5 is a diagram showing the structure of a mouse packet.

The controlling unit 203 calculates a relative movement amount of the mouse cursor (specifically, it becomes coordinates (100, −50) calculated by decreasing the coordinates of the point "A" from the coordinates of the point "B") based on the coordinates of the point "A" (200, 100) previously stored into the memory 204, and the received coordinates of the point "B" (300, 50). The controlling unit 203 produces a mouse packet by bringing the calculated cursor movement amount data (i.e., relative coordinate value data), the button data, and an acceleration invalidation flag together (step S4). Here, the produced mouse packet is shown in FIG. 5. When mouse wheel movement amount data indicative of a movement amount of a mouse wheel is transmitted from the client 4, the mouse packet may be additionally included in the mouse wheel movement amount data.

The acceleration invalidation flag indicates a flag that invalidates the acceleration/speed process executed by the mouse class driver 103 of the server 1. In the acceleration invalidation flag, a bit of a given position composing the mouse packet (e.g., a third bit included in a first byte of the mouse packet) achieves a function of the acceleration invalidation flag. For example, when the third bit included in the first byte of the mouse packet is the acceleration invalidation flag, and the third bit is set to "0", the acceleration/speed process becomes invalid. On the contrary, when the third bit is set to "1", the acceleration/speed process becomes valid.

In the present embodiment, the controlling unit 203 sets "0" to the acceleration invalidation flag in order to invalidate the acceleration/speed process.

The controlling unit 203 transmits the produced mouse packet to the exclusive device driver 102 of the server 1 (step S5).

The exclusive device driver 102 receives the mouse packet (step S6), and decomposes the received mouse packet (step S7). The exclusive device driver 102 determines whether the acceleration invalidation flag is "0" (step S8). When the acceleration invalidation flag is "0", the exclusive device driver 102 executes procedures of steps S13 and S14 described later. When the acceleration invalidation flag is "1", the exclusive device driver 102 does not execute the procedures of steps S13 and S14 described later.

The exclusive device driver 102 transmits the cursor movement amount data and the button data acquired by the decomposition of the mouse packet to the mouse class driver 103 (step S9).

The mouse class driver 103 receives the cursor movement amount data and the button data from the exclusive device driver 102 (step S10). The mouse class driver 103 executes the acceleration/speed process of the mouse cursor to the received cursor movement amount data (step S11). Cursor movement amount data after the execution of the acceleration/speed process is data in which cursor movement amount data caused by the acceleration/speed process is added to the received cursor movement amount data.

The mouse class driver 103 outputs the cursor movement amount data after the execution of the acceleration/speed process and the button data to the OS 104 (step S12).

The exclusive device driver 102 interrupts between the mouse class driver 103 and the OS 104, and acquires the cursor movement amount data after the execution of the acceleration/speed process and the button data which are output from the mouse class driver 103 to the OS 104 (step S13).

The exclusive device driver 102 removes the cursor movement amount data added by the acceleration/speed process from the cursor movement amount data after the execution of the acceleration/speed process, i.e., returns the cursor movement amount data acquired from the mouse class driver 103 to the cursor movement amount data received from the KVM switch 2, and transmits the resultant cursor movement amount data and the button data to the OS 104 (step S14).

The OS 104 executes the movement of the mouse cursor based on the received cursor movement amount data, and a process corresponding to the received button data (i.e., a mouse click and so on) (step S15).

The above-mentioned procedures of steps S1 to S15 are executed during the operation of the remote system 1000 repeatedly.

As described in detail hereinabove, according to the present embodiment, the communication I/F 101 of the server 1 inputs the cursor movement amount data (i.e., relative coordinate value data) showing the movement distance (i.e., movement amount) and the movement direction of the mouse cursor, and the acceleration invalidation flag showing effectiveness or invalidation of addition of the cursor movement amount data caused by the acceleration/speed process of the mouse cursor. The exclusive device driver 102 transmits the cursor movement amount data input to the communication I/F 101, to the mouse class driver 103. Then, when the acceleration invalidation flag shows invalidation of addition of the cursor movement amount data caused by the acceleration/speed process of the mouse cursor, the exclusive device driver 102 interrupts between the mouse class driver 103 and the OS 104, acquires the cursor movement amount data after the execution of the acceleration/speed process, removes the cursor movement amount data added by the acceleration/speed process from the cursor movement amount data after the execution of the acceleration/speed process, and transmits the resultant cursor movement amount data to the OS 104.

Therefore, the cursor movement amount data added by the acceleration/speed process is removed, and hence the mouse cursor can be moved at a correct position by remote control without being affected by a movement speed or a movement acceleration of the mouse.

Second Embodiment

A second embodiment is different from the first embodiment in that the exclusive device driver 102 transmits the cursor movement amount data and the button data to an exclusive application included in the server 1, and the exclusive application transmits a mouse event to the OS 104 by using SendInput( )API, thereby moving the mouse cursor.

Figure 6:
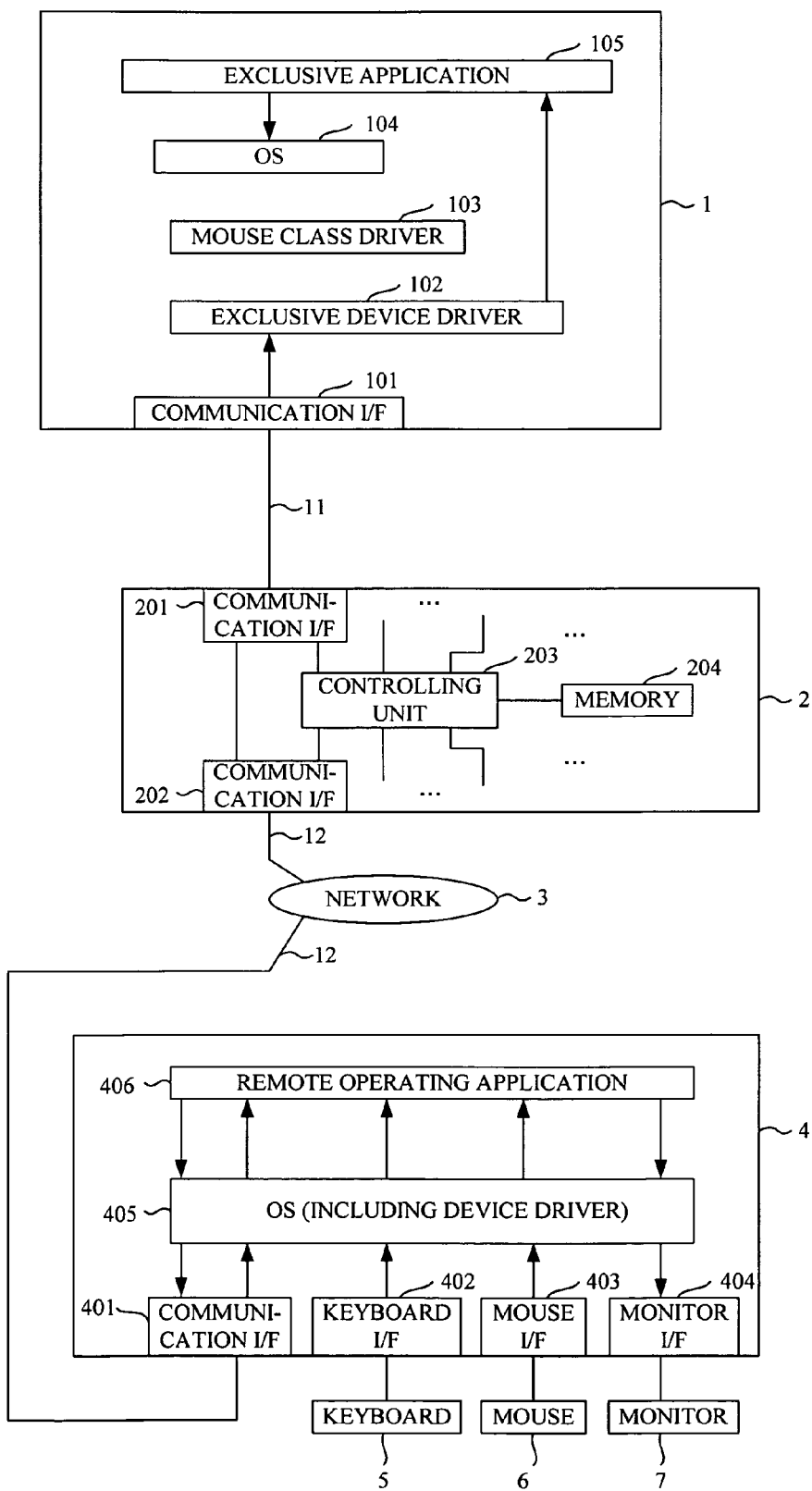
FIG. 6 is a schematic diagram showing a remote system according to a second embodiment.

FIG. 6 is a schematic diagram showing a remote system according to the second embodiment.

The remote system 1001 in FIG. 6 is different in the configuration of the server 1 from the remote system 1000 in FIG. 1. The server 1 includes the communication I/F 101, the exclusive device driver 102, the mouse class driver 103, the OS 104, and an exclusive application 105. The OS 104 is Windows (registered trademark), for example. The configuration of the KVM switch 2 and the client 4 in FIG. 6 is the same as that of the KVM switch 2 and the client 4 in FIG. 1.

The exclusive device driver 102 transmits the cursor movement amount data and the button data to the exclusive application 105. The exclusive application 105 causes an action moving the mouse cursor. The action moving the mouse cursor is a method executing the mouse event by using the SendInput( )API. The SendInput( )API is an API (Application Program Interface) of Microsoft Corporation, and has a function that can emulate the operation of the mouse and the keyboard. The exclusive application 105 transmits the mouse event corresponding to the cursor movement amount data and the button data to the OS 104 by using the SendInput( )API.

Figure 7:
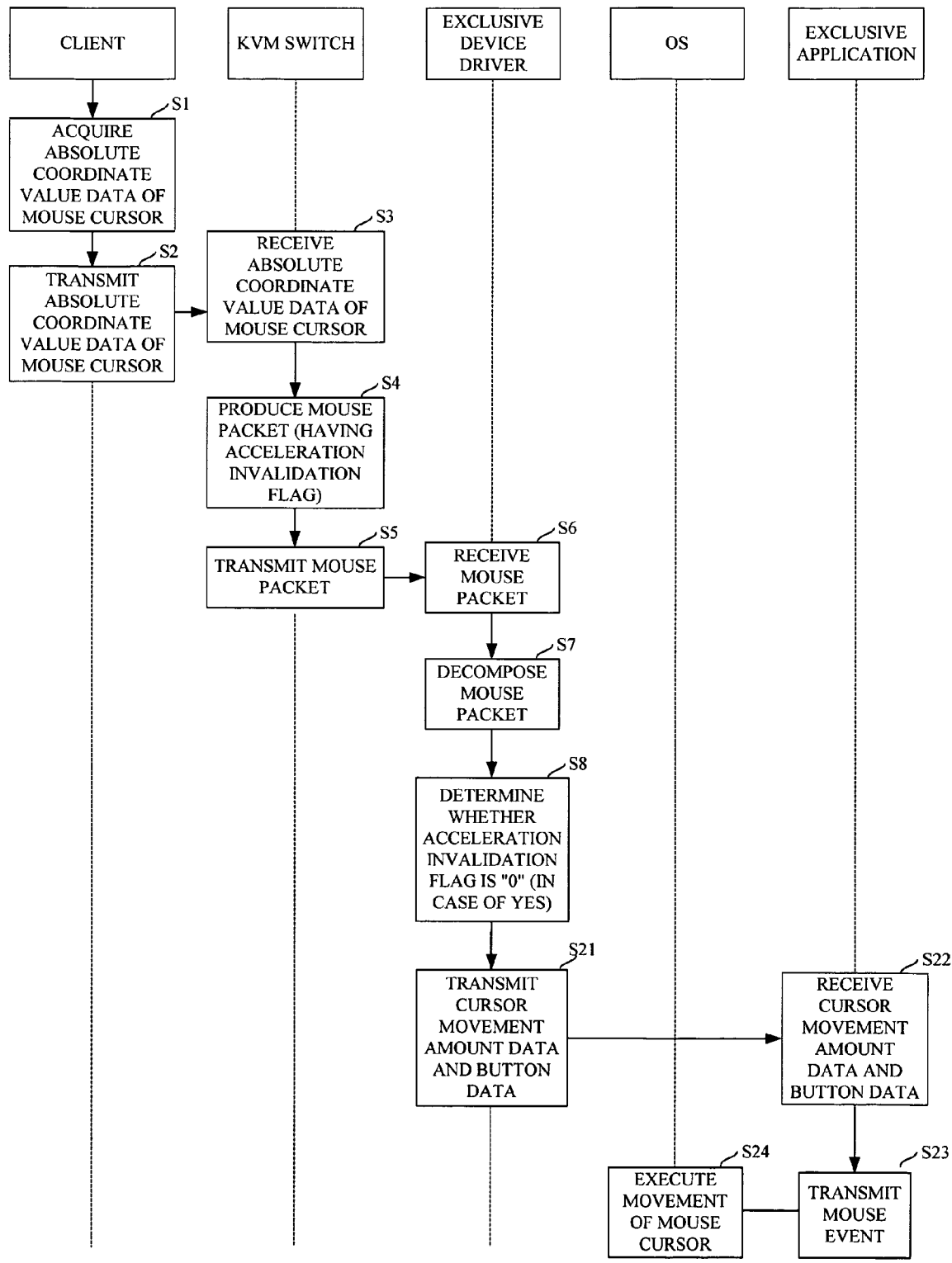
FIG. 7 is a diagram showing a process sequence executed by the client 4, the KVM switch 2, and the server 1.

FIG. 7 is a diagram showing a process sequence executed by the client 4, the KVM switch 2, and the server 1.

The procedures of steps S1 to S8 are the same as those of steps S1 to S8 in FIG. 4, and hence a description thereof is omitted. When the acceleration invalidation flag is "0", the exclusive device driver 102 executes a procedure of step S21 described later.

When the acceleration invalidation flag is "1", the exclusive device driver 102 executes the procedure of step S9 in FIG. 4, the mouse class driver 103 executes the procedures of steps S10 to S12 in FIG. 4, and the OS 104 executes the procedures of step S15 in FIG. 4.

The exclusive device driver 102 transmits the cursor movement amount data and the button data acquired by the decomposition of the mouse packet to the exclusive application 105 (step S21).

The exclusive application 105 receives the cursor movement amount data and the button data (step S22). The exclusive application 105 transmits the mouse event corresponding to the received cursor movement amount data and the received button data to the OS 104 by using the SendInput( )API (step S23).

The OS 104 executes the movement of the mouse cursor based on the received mouse event, and a process corresponding to a mouse click and so on (step S24).

The above-mentioned procedures of steps S1 to S24 are executed during the operation of the remote system 1001 repeatedly.

As described in detail hereinabove, according to the present embodiment, the server 1 further includes the exclusive application 105 that transmits the cursor movement amount data received from the client 4 via the KVM switch 2 to the OS 104 without passing the mouse class driver 103. When the acceleration invalidation flag shows invalidation of addition of the cursor movement amount data caused by the acceleration/speed process of the mouse cursor, the exclusive device driver 102 transmits the cursor movement amount data received from the client 4 via the KVM switch 2 to the exclusive application 105.

Therefore, the cursor movement amount data received from the client 4 via the KVM switch 2 detours the mouse class driver 103, and is transmitted to the OS 104 via the exclusive device driver 102 and the exclusive application 105, and hence the mouse cursor can be moved at a correct position by remote control without being affected by a movement speed or a movement acceleration of the mouse and the presence of software moving the mouse cursor.

Third Embodiment

A third embodiment is different from the first embodiment in notifying the server 1 of the absolute coordinate values of the mouse cursor.

Figure 8:
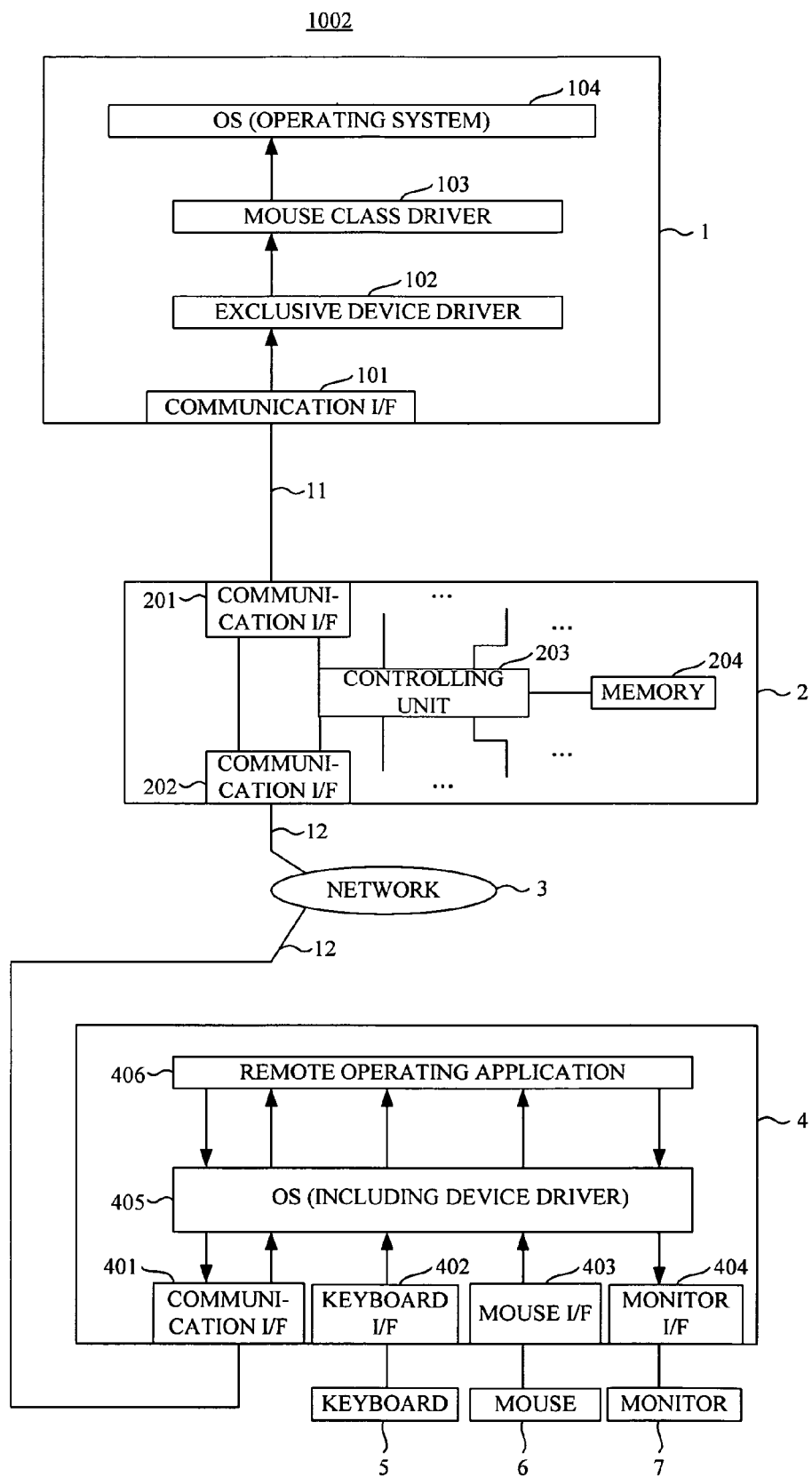
FIG. 8 is a schematic diagram showing a remote system according to a third embodiment.

FIG. 8 is a schematic diagram showing a remote system according to the third embodiment. Although a remote system 1002 in FIG. 8 is the same as the remote system 1000 in FIG. 1 with respect to the basic configuration, the remote system 1002 in FIG. 8 is different from the remote system 1000 in FIG. 1 in that the mouse class driver 103 directly transmits the absolute coordinate values of the mouse cursor to the OS 104.

Figure 9:
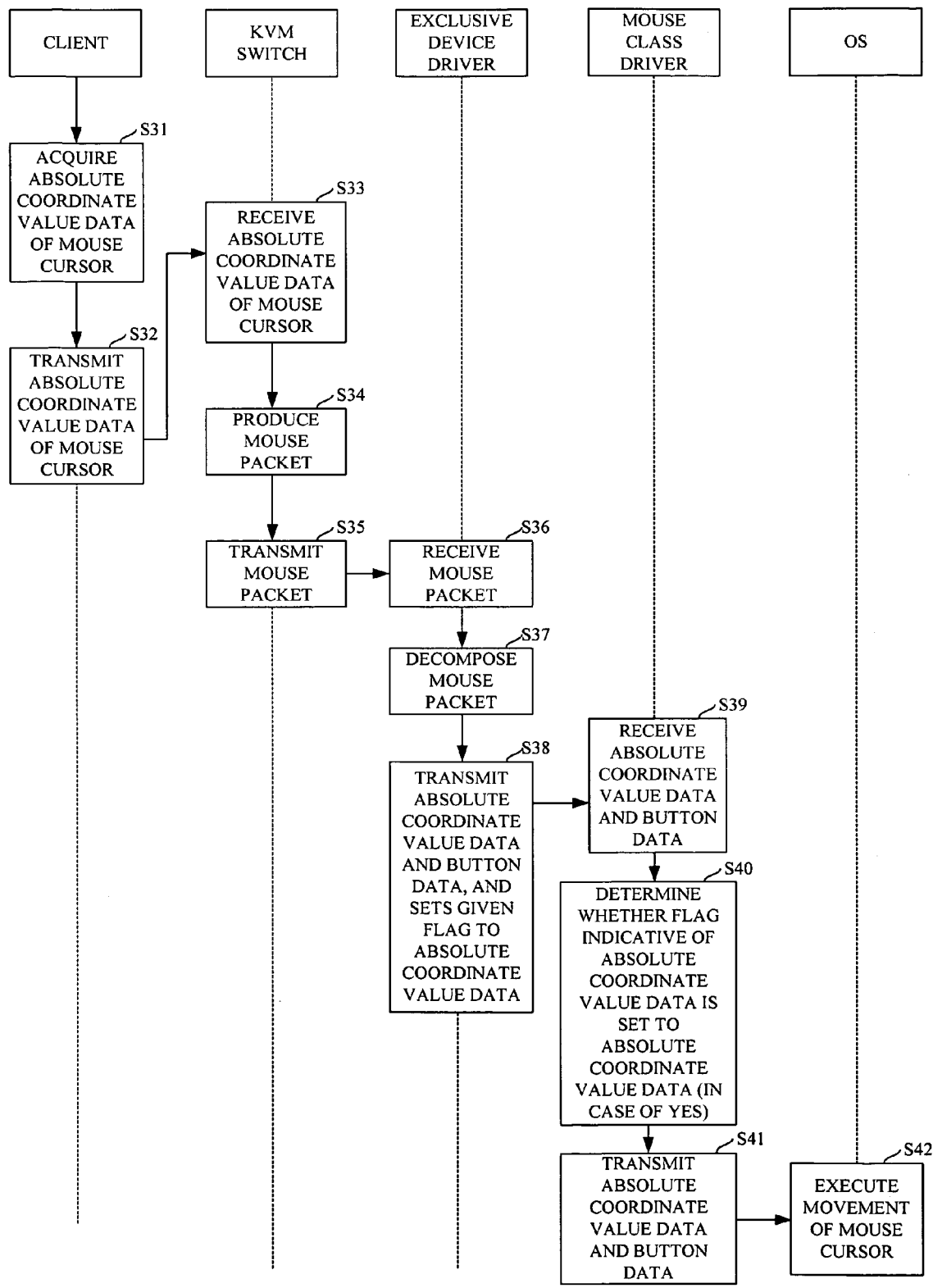
FIG. 9 is a diagram showing a process sequence executed by the client 4, the KVM switch 2, and the server 1.

FIG. 9 is a diagram showing a process sequence executed by the client 4, the KVM switch 2, and the server 1.

The CPU 421 executing the remote operating application 406 of the client 4 acquires absolute coordinate value data of the mouse cursor (specifically, an X-absolute coordinate value and a Y-absolute coordinate value) (step S31). The X-absolute coordinate value and the Y-absolute coordinate value indicates absolute coordinate values of a movement destination of the mouse cursor.

The CPU 421 transmits the absolute coordinate value data of the mouse cursor to the KVM switch 1 (step S32). At this time, if the button of the mouse 6 is depressed (clicked), the CPU 421 transmits the button data indicative of the depressed button and depressing the button to the KVM switch 2.

Figure 10:
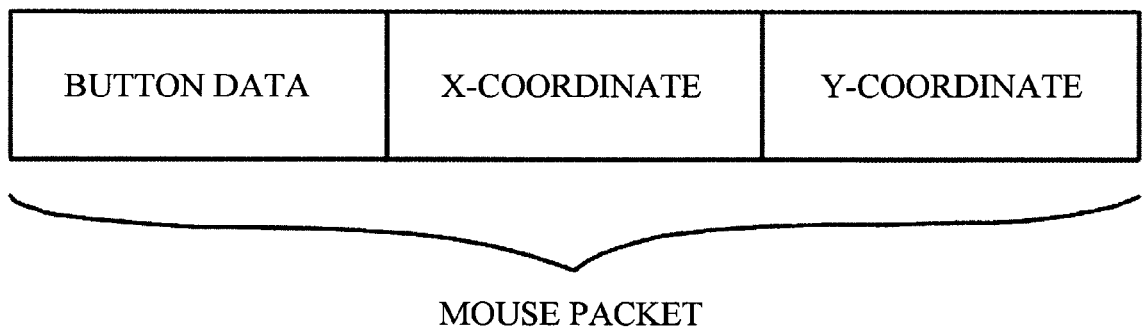
FIG. 10 is a diagram showing the structure of the mouse packet.

The controlling unit 203 receives the absolute coordinate value data and the button data from the client 4 (step S33). The controlling unit 203 produces the mouse packet by bringing the absolute coordinate value data and the button data together (step S34). Here, the produced mouse packet is shown in FIG. 10. When the mouse wheel movement amount data indicative of the movement amount of the mouse wheel is transmitted from the client 4, the mouse packet may be additionally included in the mouse wheel movement amount data.

The controlling unit 203 transmits the produced mouse packet to the exclusive device driver 102 of the server 1 (step S35).

The exclusive device driver 102 receives the mouse packet (step S36), and decomposes the received mouse packet (step S37). The exclusive device driver 102 transmits the absolute coordinate value data and the button data acquired by the decomposition of the mouse packet to the mouse class driver 103 (step S38).

At this time, the exclusive device driver 102 sets a given flag (specifically, a MOUSE_MOVE_ABSOLUTE flag) to the absolute coordinate value data to make the mouse class driver 103 recognize the movement destination of the mouse by not the relative coordinate value data but the absolute coordinate value data.

The mouse class driver 103 receives the absolute coordinate value data and the button data from the exclusive device driver 102 (step S39). At this time, the mouse class driver 103 determines whether the flag indicative of the absolute coordinate value data is set to the absolute coordinate value data (step S40). When the flag indicative of the absolute coordinate value data is set, the mouse class driver 103 transmits the absolute coordinate value data and the button data to the OS 104 (step S41).

The OS 104 executes the movement of the mouse cursor based on the received absolute coordinate value data, and a process corresponding to the received button data (i.e., a mouse click and so on) (step S42).

When the flag indicative of the absolute coordinate value data is not set in step S40, the mouse class driver 103 executes the procedures of steps S10 to S12 in FIG. 4, and the OS 104 executes the procedure of step S15 in FIG. 4.

The above-mentioned procedures of steps S31 to S42 are executed during the operation of the remote system 1002 repeatedly.

As described in detail hereinabove, according to the present embodiment, the communication I/F 101 inputs the absolute coordinate value data indicative of the coordinates of the movement destination of the mouse cursor from the client 4 via the KVM switch 2. The exclusive device driver 102 sets the flag indicative of the absolute coordinate value data to the input absolute coordinate value data. The mouse class driver 103 determines whether the flag indicates the absolute coordinate value data, and when the flag indicates the absolute coordinate value data, the mouse class driver 103 transmits the absolute coordinate value data to the OS 104.

Therefore, the absolute coordinate value data is transmitted to the OS 104 without new data being added, and hence the mouse cursor can be moved at a correct position by remote control without being affected by a movement speed or a movement acceleration of the mouse and the presence of software moving the mouse cursor.

Fourth Embodiment

In the first to third embodiments, the acceleration/speed process of the mouse cursor is prevented from being executed with server 1 during the operation of the mouse of the client 4, so that the mouse cursor displayed on the monitor 7 and the mouse cursor displayed on the screen of the server 1 are prevented from being misaligned. In a fourth embodiment, when the acceleration/speed process of the mouse cursor has been executed with the server 1 during the operation of the mouse of the client 4, the server 1 transmits (i.e., feeds back) the absolute coordinate values of the mouse cursor after the movement of the mouse cursor to the client 4, so that the mouse cursor displayed on the monitor 7 and the mouse cursor displayed on the screen of the server 1 are prevented from being misaligned.

Figure 11:
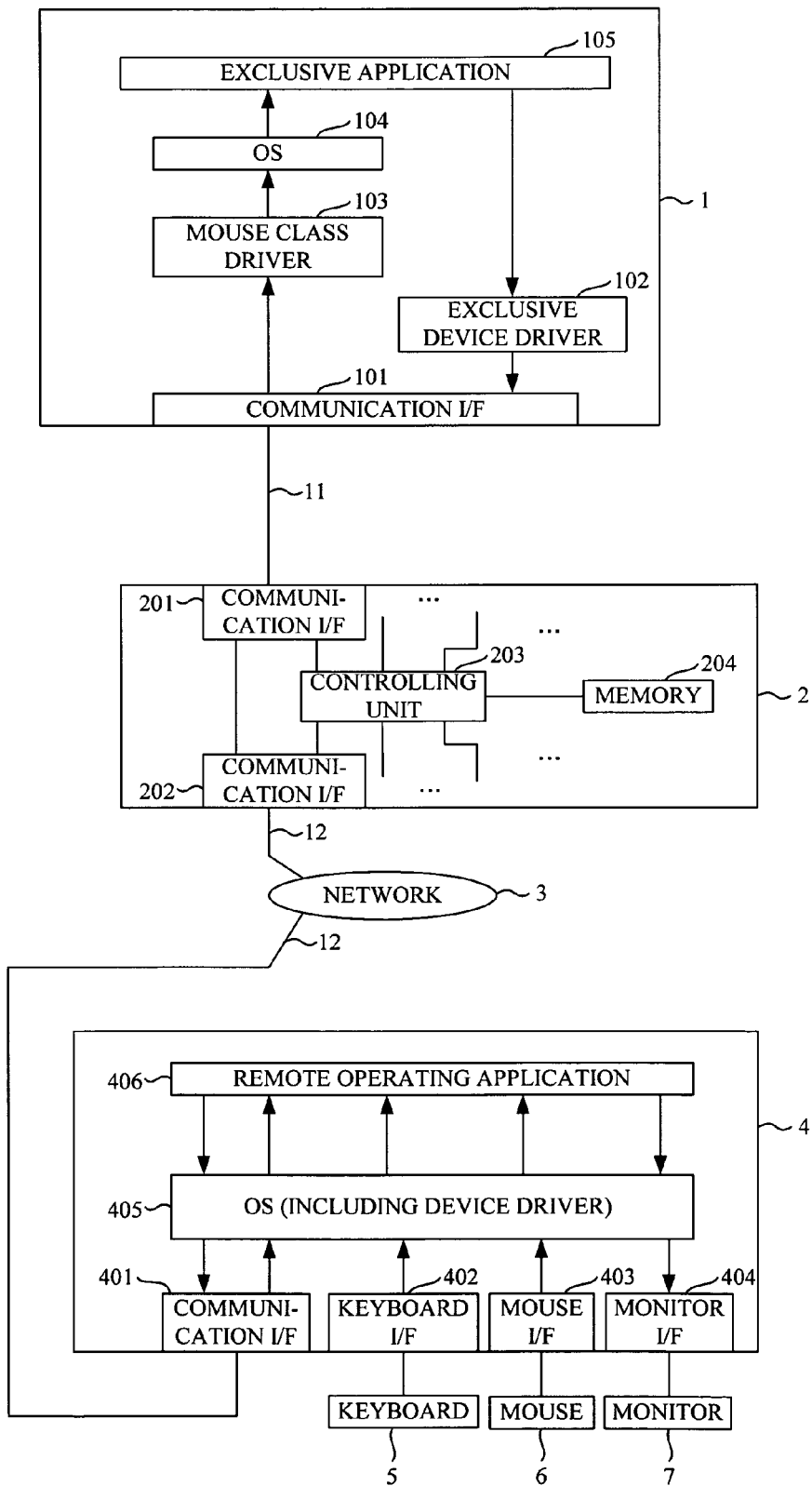
FIG. 11 is a schematic diagram showing a remote system according to a fourth embodiment.

FIG. 11 is a schematic diagram showing a remote system according to a fourth embodiment. Although a remote system 1003 in FIG. 11 is the same as the remote system 1001 in FIG. 6 with respect to the basic configuration, the remote system 1003 in FIG. 11 is different from the remote system 1000 in FIG. 6 in that after the mouse class driver 103 executes the acceleration/speed process of the mouse cursor, the server 1 transmits the absolute coordinate values of the mouse cursor after the movement of the mouse cursor to the client 4 via the OS 104, the exclusive application 105, and the exclusive device driver 102.

Figure 12:
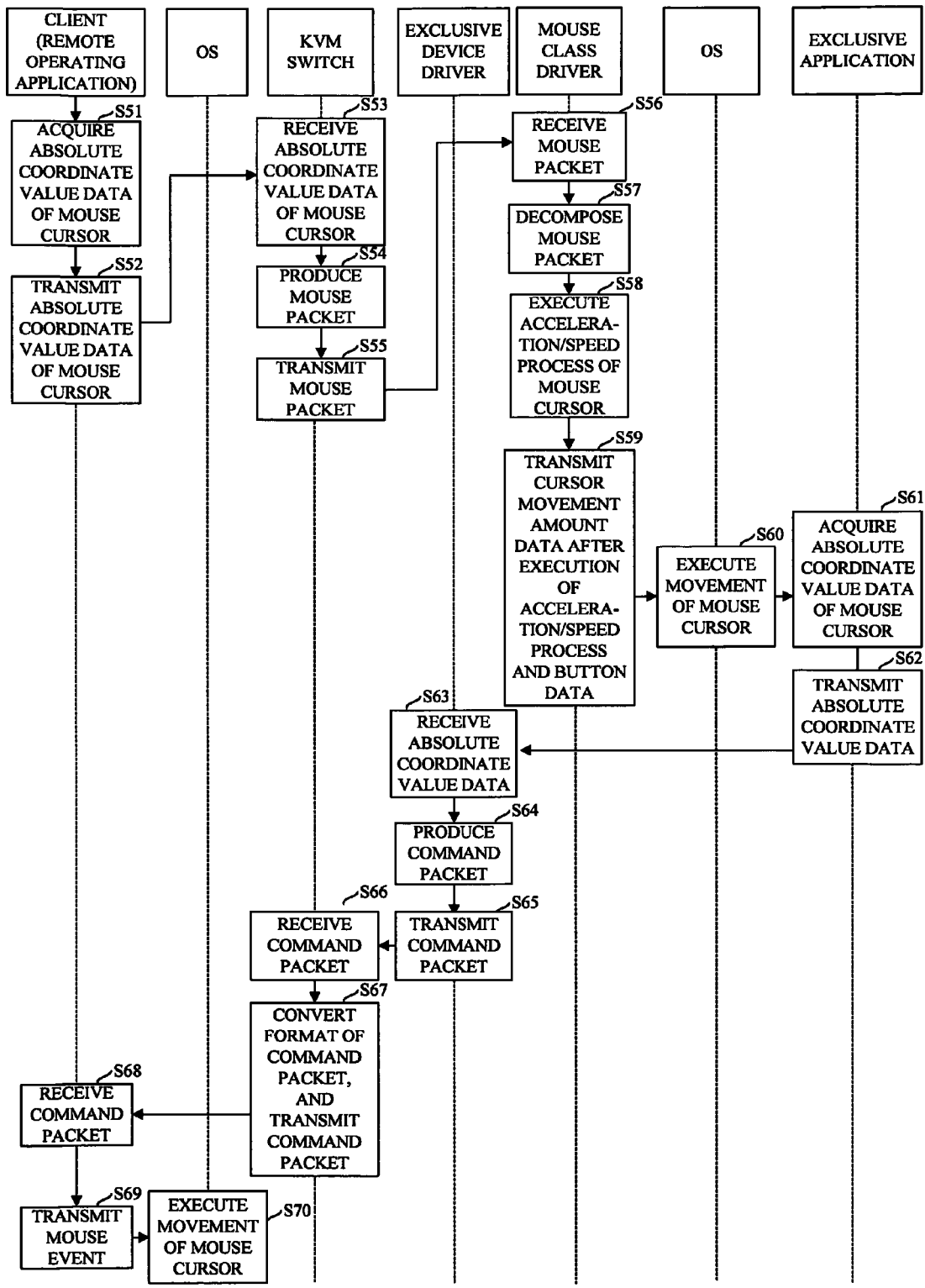
FIG. 12 is a diagram showing a process sequence executed by the client 4, the KVM switch 2, and the server 1.

FIG. 12 is a diagram showing a process sequence executed by the client 4, the KVM switch 2, and the server 1.

As a premise of the process sequence, the coordinates of the point "A" (200, 100) (absolute coordinate values) in FIGS. 3A and 3B are previously stored into the memory 204 of the KVM switch 2.

The CPU 421 executing the remote operating application 406 of the client 4 acquires the absolute coordinate value data of the mouse cursor (step S51), and transmits the acquired absolute coordinate value data of the mouse cursor to the KVM switch 2 (step S52). Here, it is considered that the mouse cursor in FIGS. 3A and 3B is moved from the coordinates of the point "A" (200, 100) to the coordinates of the point "B" (300, 50), and the CPU 421 therefore transmits the coordinates of the point "B" (300, 50) to the KVM switch 2. At this time, if the button of the mouse 6 is depressed (clicked), the CPU 421 transmits the button data indicative of the depressed button and depressing the button to the KVM switch 2.

The controlling unit 203 receives the absolute coordinate value data of the mouse cursor from the client 4 (step S53). Here, the controlling unit 203 receives the coordinates of the point "B" (300, 50). Further, when the button data is transmitted, the controlling unit 203 additionally receives the button data.

The controlling unit 203 calculates the relative movement amount of the mouse cursor (specifically, it becomes coordinates (100, −50) calculated by decreasing the coordinates of the point "A" from the coordinates of the point "B") based on the coordinates of the point "A" (200, 100) previously stored into the memory 204, and the received coordinates of the point "B" (300, 50). The controlling unit 203 produces a mouse packet by bringing the calculated cursor movement amount data (i.e., relative coordinate value data), the button data, and the acceleration invalidation flag together (step S54).

In the present embodiment, since the acceleration/speed process is not invalidated, the controlling unit 203 sets "1" to the acceleration invalidation flag.

The controlling unit 203 transmits the produced mouse packet to the exclusive device driver 102 of the server 1 (step S55).

The mouse class driver 103 receives the mouse packet (step S56), and decomposes the received mouse packet (step S57).

The mouse class driver 103 executes the acceleration/speed process of the mouse cursor to the cursor movement amount data acquired by the decomposition of the mouse packet (step S58). Cursor movement amount data after the execution of the acceleration/speed process is data in which cursor movement amount data caused by the acceleration/speed process is added to the received cursor movement amount data. The mouse class driver 103 transmits the cursor movement amount data after the execution of the acceleration/speed process and the button data to the OS 104 (step S59).

The OS 104 executes the movement of the mouse cursor based on the received cursor movement amount data, and a process corresponding to the received button data (i.e., a mouse click and so on) (step S60).

The exclusive application 105 acquires the absolute coordinate value data of the mouse cursor after the movement of the mouse cursor (specifically, the X-absolute coordinate value and the Y-absolute coordinate value) (step S61), and transmits the acquired absolute coordinate value data to the exclusive device driver 102 (step S62).

The exclusive device driver 102 receives the absolute coordinate value data (step S63), and produces a command packet based on the received absolute coordinate value data (step S64). This command packet includes the X-absolute coordinate value and the Y-absolute coordinate value, and has a format pursuant to a specification (e.g., USB or PS/2) of the communication I/F 101 and the communication I/F 201. The exclusive device driver 102 transmits the produced command packet to the KVM switch 2 (step S65).

The controlling unit 203 of the KVM switch 2 receives the command packet from the exclusive device driver 102 (step S66), converts the format of the received command packet into a format pursuant to a specification (e.g., TCP/IP) of the communication I/F 202 and the communication I/F 401, and transmit the command packet having the converted format to the client 4 (step S67).

The CPU 421 executing the remote operating application 406 of the client 4 receives the command packet from the KVM switch 2 (step S68), and transmits a mouse event corresponding to the absolute coordinate value data included in the received command packet to the OS 405 (step S69).

The OS 405 executes the movement of the mouse cursor based on the received mouse event (step S70).

The above-mentioned procedures of steps S51 to S70 are executed during the operation of the remote system 1003 repeatedly.

As described in detail hereinabove, according to the present embodiment, the communication I/F 101 inputs the cursor movement amount data (i.e., relative coordinate value data) showing the movement distance (i.e., movement amount) and the movement direction of the mouse cursor, and the acceleration invalidation flag showing effectiveness or invalidation of addition of the cursor movement amount data caused by the acceleration/speed process of the mouse cursor. The exclusive application 105 acquires the absolute coordinate value data showing the coordinates of the mouse cursor after the execution of the acceleration/speed process. The exclusive device driver 102 transfers the absolute coordinate value data to the client 4 via the KVM switch 2. The OS 405 of the client 4 adjusts the position of the mouse cursor based on the absolute coordinate value data acquired from the server 1 via the KVM switch 2.

Therefore, even when the mouse cursor is moved based on the acceleration/speed process of the mouse cursor, the absolute coordinate value data showing the coordinates of the mouse cursor after the movement of the mouse cursor is transferred to the client 4 via the KVM switch 2, and the position of the mouse cursor is adjusted based on the absolute coordinate value data. Accordingly, the mouse cursor can be moved at a correct position by remote control without being affected by a movement speed or a movement acceleration of the mouse and the presence of software moving the mouse cursor.

Fifth Embodiment

In a fifth embodiment, the exclusive device driver 102 in the server 1 receives the cursor movement amount data (i.e., relative coordinate value data) from the KVM switch 2, converts the relative coordinate value data into the absolute coordinate value data, and outputs the converted absolute coordinate value data to the OS 104 via the mouse class driver 103.

Figure 13:
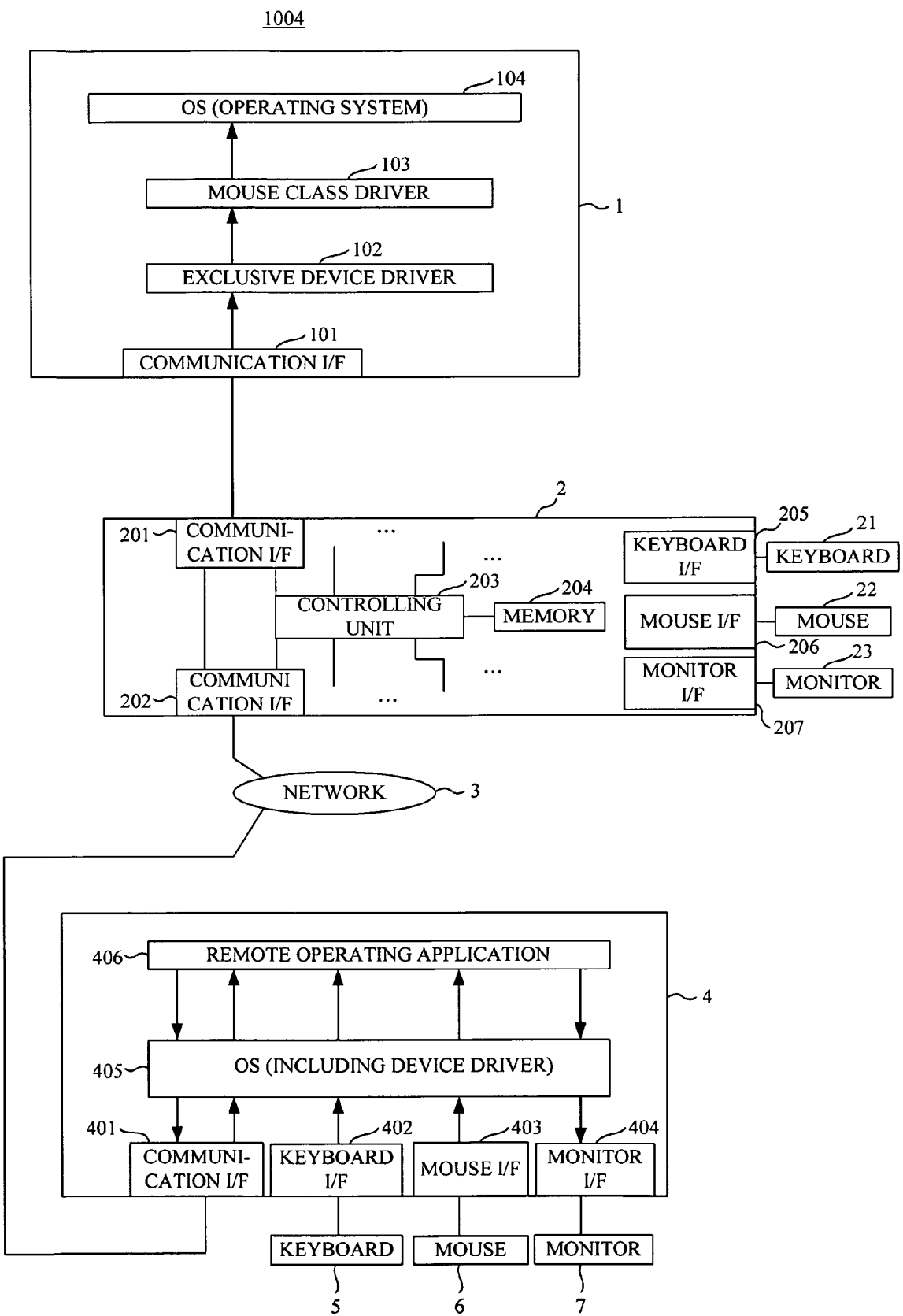
FIG. 13 is a schematic diagram showing a remote system according to a fifth embodiment.

FIG. 13 is a schematic diagram showing a remote system according to the fifth embodiment.

The remote system 1004 in FIG. 13 is different from the remote system 1002 in FIG. 8 in the configuration of the KVM switch 2. In the KVM switch 2 of FIG. 13, a keyboard I/F 205, a mouse I/F 206, and a monitor I/F 207 are connected to the controlling unit 203. Further, a keyboard 21, a mouse 22, and a monitor 23 are connected to the keyboard I/F 205, the mouse I/F 206, and the monitor I/F 207, respectively. The mouse 22 moves the mouse cursor in the screen data of the server 1, and the monitor 23 displays the screen data of the server 1.

It should be noted that the KVM switch 2 in the remote systems 1000 to 1003 also may include the keyboard I/F 205, the mouse I/F 206, and the monitor I/F 207.

Figure 14:
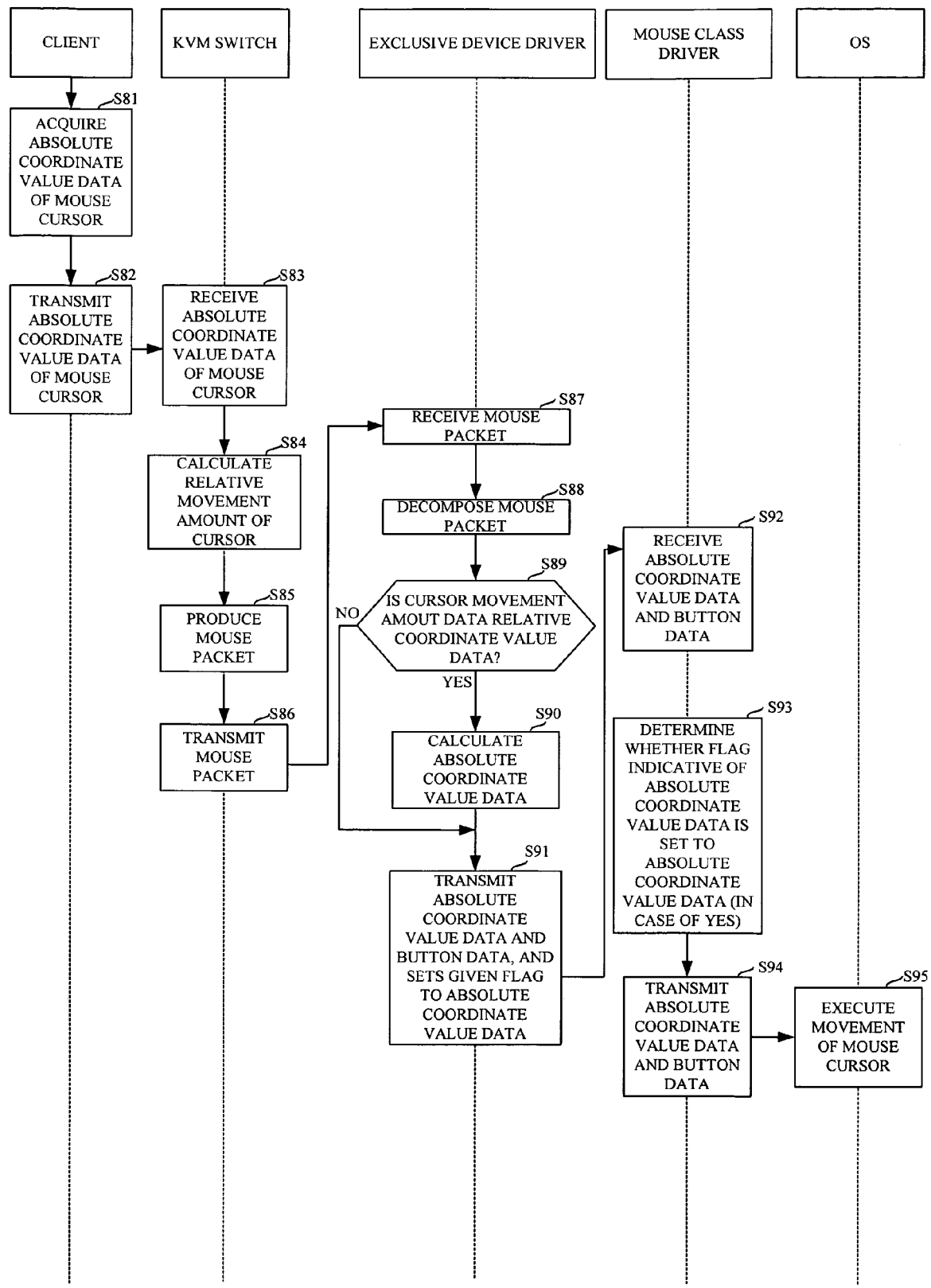
FIG. 14 is a diagram showing a process sequence executed by the client 4, the KVM switch 2, and the server 1.

FIG. 14 is a diagram showing a process sequence executed by the client 4, the KVM switch 2, and the server 1.

It is required that, before the process sequence is started, the mouse cursor in the remote operating application 406 and the mouse cursor in the screen of the server 1 are set at the same position (e.g. the coordinates (0, 0) of the original point "O"). Therefore, the KVM switch 2 transmits a mouse packet including a flag which moves the position of the mouse cursor in the screen of the server 1 to a certain position (e.g. the coordinates (0, 0) of the original point "O") to the exclusive device driver 102 in response to a trigger composed of turning on the power supply of the KVM switch 2, or given information transmitted from the remote operating application 406 via the OS 405, the communication I/F 401, and network 3. The exclusive device driver 102 transmits absolute coordinate value data showing the certain position, and the button data to the mouse class driver 103.

It is required that, before the process sequence is started, the exclusive device driver 102 previously knows a resolution of the screen of the server 1. Therefore, the KVM switch 2 transmits a mouse packet including information showing the resolution of the screen of the server 1 and a flag showing that the information is included to the exclusive device driver 102 in response to a trigger composed of turning on the power supply of the KVM switch 2, or given information transmitted from the remote operating application 406 via the OS 405, the communication I/F 401, and network 3. Further, it is assumed that the absolute coordinate value data of the current coordinates of the mouse cursor in the remote operating application 406 and the information showing the resolution of the screen of the server 1 are previously stored into the memory 204 of the KVM switch 2 and the RAM 123 or the HDD 124 of the server 1.

The CPU 421 executing the remote operating application 406 of the client 4 acquires absolute coordinate value data of the mouse cursor after the mouse cursor moves (step S81), and transmits the absolute coordinate value data of the mouse cursor to the KVM switch 1 (step S82). At this time, if the button of the mouse 6 is depressed (clicked), the CPU 421 transmits the button data indicative of the depressed button and depressing the button to the KVM switch 2.

The controlling unit 203 of the KVM switch 2 receives the absolute coordinate value data and the button data from the client 4 (step S83). Here, if the button data is transmitted to the KVM switch 2, the controlling unit 203 also receives the button data.

Figure 15:
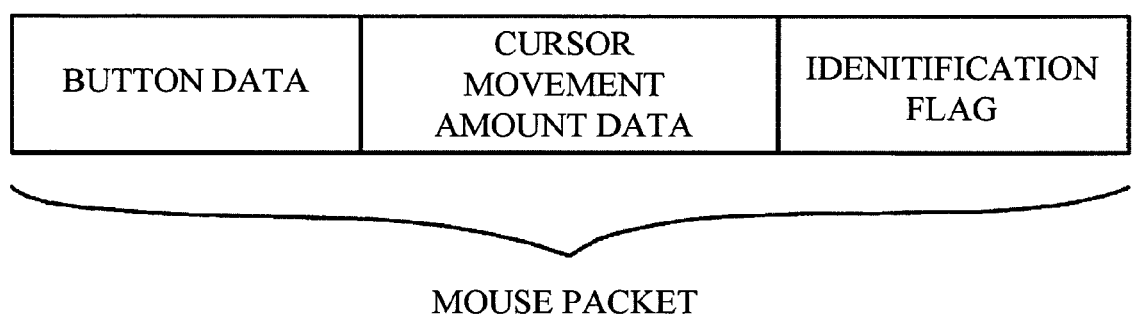
FIG. 15 is a diagram showing the structure of a mouse packet.

The controlling unit 203 calculates the relative movement amount of the mouse cursor (i.e., relative coordinate value data) based on the absolute coordinate value data of the current coordinates of the mouse cursor which is previously stored into the memory 204, and the absolute coordinate value data of the mouse cursor received from the client 4 (step S84). The controlling unit 203 produces the mouse packet by bringing together the calculated cursor movement amount data (i.e., relative coordinate value data), the button data, and an identification flag showing whether the cursor movement amount data is the relative coordinate value data or the absolute coordinate value data (step S85). Here, the produced mouse packet is shown in FIG. 15.

In the present embodiment, when the controlling unit 203 produces the mouse packet, the controlling unit 203 sets the identification flag showing that the cursor movement amount data is the relative coordinate value data, in the mouse packet. When the absolute coordinate value data is input to the KVM switch 2 from the client 4 or the mouse 22 connected to the KVM switch 2, the controlling unit 203 sets the identification flag showing that the cursor movement amount data is the absolute coordinate value data, in the mouse packet, and produces the mouse packet. By doing so, the exclusive device driver 102 in the server 1 need not execute a process to calculate the absolute coordinate value data, as described later, and can reduce process time.

The controlling unit 203 transmits the produced mouse packet to the exclusive device driver 102 of the server 1 (step S86).

The exclusive device driver 102 receives the mouse packet (step S87), and decomposes the received mouse packet (step S88). The exclusive device driver 102 determines whether the cursor movement amount data is the relative coordinate value data, based on the identification flag (step S89).

When the answer to the determination of step S89 is "YES", the exclusive device driver 102 adds the cursor movement amount data (i.e., relative coordinate value data) included in the mouse packet to the absolute coordinate value data of the current coordinates of the mouse cursor which is previously stored into the RAM 123 or the HDD 124 of the server 1 to calculate absolute coordinate value data showing coordinates of the mouse cursor of a movement destination (step S90).

Then, the exclusive device driver 102 transmits the absolute coordinate value data and the button data to the mouse class driver 103 (step S91). When the answer to the determination of step S89 is "NO", the procedure proceeds to step S91.

At this time, the exclusive device driver 102 sets a given flag (specifically, a MOUSE_MOVE_ABSOLUTE flag) to the absolute coordinate value data to make the mouse class driver 103 recognize the movement destination of the mouse by not the relative coordinate value data but the absolute coordinate value data.

The mouse class driver 103 receives the absolute coordinate value data and the button data from the exclusive device driver 102 (step S92). At this time, the mouse class driver 103 determines whether the flag indicative of the absolute coordinate value data is set to the absolute coordinate value data (step S93). When the flag indicative of the absolute coordinate value data is set, the mouse class driver 103 transmits the absolute coordinate value data and the button data to the OS 104 (step S94).

The OS 104 executes the movement of the mouse cursor based on the received absolute coordinate value data, and a process corresponding to the received button data (i.e., a mouse click and so on) (step S95).

When the flag indicative of the absolute coordinate value data is not set in step S93, the mouse class driver 103 executes the procedures of steps S10 to S12 in FIG. 4, and the OS 104 executes the procedure of step S15 in FIG. 4.

The above-mentioned procedures of steps S81 to S95 are executed during the operation of the remote system 1002 repeatedly.

As described in detail hereinabove, according to the present embodiment, the exclusive device driver 102 adds the input relative coordinate value data to the absolute coordinate value data of the current coordinates of the mouse cursor which is previously stored into the RAM 123 or the HDD 124 to calculate absolute coordinate value data showing coordinates of the mouse cursor of the movement destination, and transmits the calculated absolute coordinate value data to the OS 104.

Therefore, the absolute coordinate value data is transmitted to the OS 104 without new data being added, and hence the mouse cursor can be moved at a correct position by remote control without being affected by a movement speed or a movement acceleration of the mouse and the presence of software moving the mouse cursor.

According to the second to fifth embodiments, even when a smart moving function which automatically moves the mouse cursor on a button such as a OK button or a cancel button is effective in the server 1, the mouse cursor can be moved at a correct position by remote control without being affected by the presence of such a function and software which automatically moves the mouse cursor.

A recording medium on which the software program for realizing the functions of the server 1 is recorded may be supplied to the server 1, and the CPU 121 of the server 1 may read and execute the program recorded on the recording medium. In this manner, the same effects as those of the above-described first to fourth embodiments can be achieved. The recording medium for providing the program may be a CD-ROM, a DVD, or a SD card, for example.

The CPU 121 of the server 1 may execute the software program for realizing the functions of the server 1. In this manner, the same effects as those of the above-described first to fourth embodiments can also be achieved.

It should be noted that the present invention is not limited to the embodiment, and various modifications may be made to them without departing from the scope of the invention.

Finally, several aspects of the present invention are summarized below.

According to a first aspect of the present invention, there is provided an information processing apparatus including: a mouse driver that adds a second relative coordinate value data to a first relative coordinate value data showing a movement distance and a movement direction of a mouse cursor, and transmits the combined relative coordinate value data to an operating system; an input portion that inputs the first relative coordinate value data from an external device via a KVM switch, and a flag showing effectiveness or invalidation of adding the second relative coordinate value data to the first relative coordinate value data; and a controlling portion that transmits the first relative coordinate value data input to the input portion to the mouse driver, and when the flag shows invalidation of addition of the second relative coordinate value data, the controlling portion interrupting between the mouse driver and the operating system, acquiring the combined relative coordinate value data, removing the second relative coordinate value data from the combined relative coordinate value data, and transmitting the first relative coordinate value data to the operating system.

With the above arrangement, the second relative coordinate value data added to the first relative coordinate value data is removed, and hence the mouse cursor can be moved at a correct position by remote control without being affected by a movement speed or a movement acceleration of a mouse. The input portion and the controlling portion correspond to the CPU 121 executing the exclusive device driver 102.

Preferably, the information processing apparatus further includes a transmission portion that transmits the first relative coordinate value data to the operating system without passing the mouse driver, wherein when the flag shows invalidation of addition of the second relative coordinate value data, the controlling portion transmits the first relative coordinate value data to the transmission portion.

With the above arrangement, the first relative coordinate value data detours the mouse driver, and is transmitted to the operating system via the input portion and the controlling portion, and hence the mouse cursor can be moved at a correct position by remote control without being affected by the movement speed or the movement acceleration of the mouse and the presence of software moving the mouse cursor. The transmission portion corresponds to the CPU 121 executing the exclusive application 105.

According to a second aspect of the present invention, there is provided an information processing apparatus including: an input portion that inputs absolute coordinate value data showing coordinates of a mouse cursor of a movement destination from an external device via a KVM switch; a setting portion that sets a flag showing the absolute coordinate value data to the input absolute coordinate value data; a determination portion that determines whether the flag shows the absolute coordinate value data; and a transmission portion that transmits the absolute coordinate value data to an operating system when it is determined that the flag shows the absolute coordinate value data.

With the above arrangement, the absolute coordinate value data is transmitted to the operating system without new data being added, and hence the mouse cursor can be moved at a correct position by remote control without being affected by a movement speed or a movement acceleration of the mouse and the presence of software moving the mouse cursor. The input portion and the setting portion correspond to the CPU 121 executing the exclusive device driver 102. The determination portion and the transmission portion correspond to the CPU 121 executing the mouse class driver 103.

According to a third aspect of the present invention, there is provided an information processing apparatus including: a mouse driver that adds a second relative coordinate value data to a first relative coordinate value data showing a movement distance and a movement direction of a mouse cursor, and transmits the combined relative coordinate value data to an operating system; an acquiring portion that acquires absolute coordinate value data showing coordinates of the mouse cursor after the mouse cursor is moved based on the combined relative coordinate value data; and a transfer portion that transfers the acquired absolute coordinate value data to an external device via a KVM switch.

With the above arrangement, even when the mouse cursor is moved based on the combined absolute coordinate value data, the absolute coordinate value data showing coordinates of the mouse cursor after the mouse cursor is moved is transferred to the external device via the KVM switch. Therefore, the external device can adjust the position of the mouse cursor based on the absolute coordinate value data. As a result, the mouse cursor can be moved at a correct position by remote control without being affected by a movement speed or a movement acceleration of the mouse and the presence of software moving the mouse cursor. The acquiring portion corresponds to the CPU 121 executing the exclusive application 105, and the transfer portion corresponds to the CPU 121 executing the exclusive device driver 102 and the exclusive application 105.

According to a fourth aspect of the present invention, there is provided an information processing apparatus including: a storage that stores first absolute coordinate value data showing current coordinates of a mouse cursor; an input portion that inputs relative coordinate value data showing a movement distance and a movement direction of the mouse cursor from an external device via a KVM switch; a calculation portion that adds the relative coordinate value data input by the input portion to the first absolute coordinate value data stored into the storage to calculate second absolute coordinate value data showing coordinates of the mouse cursor of a movement destination; and a transmission portion that transmits the calculated second absolute coordinate value data to an operating system.

With the above arrangement, the second absolute coordinate value data is transmitted to the operating system without new data being added, and hence the mouse cursor can be moved at a correct position by remote control without being affected by a movement speed or a movement acceleration of the mouse and the presence of software moving the mouse cursor. The storage corresponds to the RAM 123 or the HDD 124 in FIG. 2. The input portion, the calculation portion and the transmission portion correspond to the CPU 121 executing the exclusive device driver 102.

According to a fifth aspect of the present invention, there is provided a remote system including: a server including a mouse driver that adds a second relative coordinate value data to a first relative coordinate value data showing a movement distance and a movement direction of a mouse cursor, and transmits the combined relative coordinate value data to an operating system; a KVM switch that is connected to the server; and a client that is connected to the KVM switch, displays screen data of the server, and directs operation to the server, the KVM switch including: a reception portion that receives the first relative coordinate value data from the client; and a setting portion that sets a flag showing effectiveness or invalidation of adding the second relative coordinate value data to the first relative coordinate value data, and the server including: an input portion that inputs the first relative coordinate value data and the flag from the KVM switch; and a controlling portion that transmits the first relative coordinate value data input to the input portion to the mouse driver, and when the flag shows invalidation of addition of the second relative coordinate value data, the controlling portion interrupting between the mouse driver and the operating system, acquiring the combined relative coordinate value data, removing the second relative coordinate value data from the combined relative coordinate value data, and transmitting the first relative coordinate value data to the operating system.

With the above arrangement, the second relative coordinate value data added to the first relative coordinate value data is removed, and hence the mouse cursor can be moved at a correct position by remote control without being affected by a movement speed or a movement acceleration of the mouse. The reception portion and the setting portion correspond to the controlling unit 203, and the input portion and the controlling portion correspond to the CPU 121 executing the exclusive device driver 102.

Preferably, the remote system further includes a transmission portion that transmits the first relative coordinate value data to the operating system without passing the mouse driver, wherein when the flag shows invalidation of addition of the second relative coordinate value data, the controlling portion transmits the first relative coordinate value data to the transmission portion.

With the above arrangement, the first relative coordinate value data detours the mouse driver, and is transmitted to the operating system via the input portion and the controlling portion, and hence the mouse cursor can be moved at a correct position by remote control without being affected by the movement speed or the movement acceleration of the mouse and the presence of software moving the mouse cursor.

According to a sixth aspect of the present invention, there is provided a remote system including: a server, a KVM switch connected to the server, and a client that is connected to the KVM switch, displays screen data of the server, and directs operation to the server, the KVM switch including: a reception portion that receives absolute coordinate value data showing coordinates of a mouse cursor of a movement destination from the client; and a first transmission portion that transmits the absolute coordinate value data to the server, and the server including: an input portion that inputs the absolute coordinate value data from the KVM switch; a setting portion that sets a flag showing the absolute coordinate value data to the input absolute coordinate value data; a determination portion that determines whether the flag shows the absolute coordinate value data; and a second transmission portion that transmits the absolute coordinate value data to an operating system when it is determined that the flag shows the absolute coordinate value data.

With the above arrangement, the absolute coordinate value data is transmitted to the operating system without new data being added, and hence the mouse cursor can be moved at a correct position by remote control without being affected by a movement speed or a movement acceleration of the mouse and the presence of software moving the mouse cursor. The reception portion and the first transmission portion correspond to the controlling unit 203. The input portion and the setting portion correspond to the CPU 121 executing the exclusive device driver 102. The determination portion and the second transmission portion correspond to the CPU 121 executing the mouse class driver 103.

According to a seventh aspect of the present invention, there is provided a remote system comprising: a server including a mouse driver that adds a second relative coordinate value data to a first relative coordinate value data showing a movement distance and a movement direction of a mouse cursor, and transmits the combined relative coordinate value data to an operating system; a KVM switch that is connected to the server; and a client that is connected to the KVM switch, displays screen data of the server, and directs operation to the server, the KVM switch including: a reception portion that receives the first relative coordinate value data from the client; and a setting portion that sets a flag showing effectiveness or invalidation of adding the second relative coordinate value data to the first relative coordinate value data, the server including: an input portion that inputs the flag showing effectiveness of adding the second relative coordinate value data to the first relative coordinate value data; an acquiring portion that acquires absolute coordinate value data showing coordinates of the mouse cursor after the mouse cursor is moved based on the combined relative coordinate value data; and a transfer portion that transfers the acquired absolute coordinate value data to the client via the KVM switch, and the client including: an adjusting portion that adjusts a position of the mouse cursor based on the absolute coordinate value data acquired from the server via the KVM switch.

With the above arrangement, even when the mouse cursor is moved based on the combined absolute coordinate value data, the absolute coordinate value data showing coordinates of the mouse cursor after the mouse cursor is moved is transferred to the client via the KVM switch. Therefore, the mouse cursor can be moved at a correct position by remote control without being affected by a movement speed or a movement acceleration of the mouse and the presence of software moving the mouse cursor. The reception portion and the setting portion correspond to the controlling unit 203. The input portion and the acquiring portion correspond to the CPU 121 executing the exclusive application 105, and the transfer portion corresponds to the CPU 121 executing the exclusive device driver 102 and the exclusive application 105. The adjusting portion corresponds to the CPU 421 executing the OS 405.

According to an eighth aspect of the present invention, there is provided a remote system comprising: a server, an KVM switch connected to the server, and a client that is connected to the KVM switch, displays screen data of the server, and directs operation to the server, the KVM switch including: a setting portion that sets an identification flag showing whether data input from the client or a mouse connected to the KVM switch is second absolute coordinate value data showing coordinates of a mouse cursor of a movement destination or relative coordinate value data showing a movement distance and a movement direction of the mouse cursor; and a first transmission portion that transmits the identification flag set by the setting portion, and the second absolute coordinate value data or the relative coordinate value data to the server, and the server including: a storage that stores first absolute coordinate value data showing current coordinates of the mouse cursor; an input portion that inputs the identification flag, and the second absolute coordinate value data or the relative coordinate value data; a calculation portion that, when the identification flag shows that the data input from the client or the mouse connected to the KVM switch is the relative coordinate value data, adds the relative coordinate value data input by the input portion to the first absolute coordinate value data stored into the storage to calculate the second absolute coordinate value data; and a second transmission portion that transmits the calculated second absolute coordinate value data to an operating system of the server.

With the above arrangement, the second absolute coordinate value data is transmitted to the operating system without new data being added, and hence the mouse cursor can be moved at a correct position by remote control without being affected by a movement speed or a movement acceleration of the mouse and the presence of software moving the mouse cursor. The setting portion and the first transmission portion correspond to the controlling unit 203. The storage corresponds to the RAM 123 or the HDD 124. The input portion, the calculation portion and the second transmission portion correspond to the CPU 121 executing the exclusive device driver 102.

Preferably, when the identification flag shows that the data input from the client or the mouse connected to the KVM switch is the second absolute coordinate value data, the second transmission portion transmits the second absolute coordinate value data input by the input portion to the operating system of the server.

With the above arrangement, it is not necessary to execute a process to calculate the second absolute coordinate value data, and process time can be reduced.

According to a ninth aspect of the present invention, there is provided a computer readable medium causing a computer to execute a process, the process comprising: a mouse driving step that adds a second relative coordinate value data to a first relative coordinate value data showing a movement distance and a movement direction of a mouse cursor, and transmits the combined relative coordinate value data to an operating system; an input step that inputs the first relative coordinate value data from an external device via a KVM switch, and a flag showing effectiveness or invalidation of adding the second relative coordinate value data to the first relative coordinate value data; and a controlling step that transmits the input first relative coordinate value data to the mouse driver, and when the flag shows invalidation of addition of the second relative coordinate value data, the controlling step interrupting between the mouse driver and the operating system, acquiring the combined relative coordinate value data, removing the second relative coordinate value data from the combined relative coordinate value data, and transmitting the first relative coordinate value data to the operating system.

With the above arrangement, the second relative coordinate value data added to the first relative coordinate value data is removed, and hence the mouse cursor can be moved at a correct position by remote control without being affected by a movement speed or a movement acceleration of a mouse.

Preferably, the computer readable medium further including a transmission step that transmits the first relative coordinate value data to the operating system without passing the mouse driving step, wherein when the flag shows invalidation of addition of the second relative coordinate value data, the controlling step transmits the first relative coordinate value data to the transmission step.

With the above arrangement, the first relative coordinate value data detours the mouse driving step, and is transmitted to the operating system via the input portion and the controlling portion, and hence the mouse cursor can be moved at a correct position by remote control without being affected by the movement speed or the movement acceleration of the mouse and the presence of software moving the mouse cursor.

According to a tenth aspect of the present invention, there is provided a computer readable medium causing a computer to execute a process, the process including: an input step that inputs absolute coordinate value data showing coordinates of a mouse cursor of a movement destination from an external device via a KVM switch; a setting step that sets a flag showing the absolute coordinate value data to the input absolute coordinate value data; a determination step that determines whether the flag shows the absolute coordinate value data; and a transmission step that transmits the absolute coordinate value data to an operating system when it is determined that the flag shows the absolute coordinate value data.

With the above arrangement, the absolute coordinate value data is transmitted to the operating system without new data being added, and hence the mouse cursor can be moved at a correct position by remote control without being affected by a movement speed or a movement acceleration of the mouse and the presence of software moving the mouse cursor.

According to an eleventh aspect of the present invention, there is provided a computer readable medium causing a computer to execute a process, the process comprising: a mouse driving step that adds a second relative coordinate value data to a first relative coordinate value data showing a movement distance and a movement direction of a mouse cursor, and transmits the combined relative coordinate value data to an operating system; an acquiring step that acquires absolute coordinate value data showing coordinates of the mouse cursor after the mouse cursor is moved based on the combined relative coordinate value data; and a transfer step that transfers the acquired absolute coordinate value data to an external device via a KVM switch.

With the above arrangement, even when the mouse cursor is moved based on the combined absolute coordinate value data, the absolute coordinate value data showing coordinates of the mouse cursor after the mouse cursor is moved is transferred to the external device via the KVM switch. Therefore, the external device can adjust the position of the mouse cursor based on the absolute coordinate value data. As a result, the mouse cursor can be moved at a correct position by remote control without being affected by a movement speed or a movement acceleration of the mouse and the presence of software moving the mouse cursor.

According to a twelfth aspect of the present invention, there is provided a computer readable medium causing a computer to execute a process, the process comprising: a storing step that stores first absolute coordinate value data showing current coordinates of a mouse cursor into a storage; an input step that inputs relative coordinate value data showing a movement distance and a movement direction of the mouse cursor from an external device via a KVM switch; a calculation portion that adds the relative coordinate value data input by the input portion to the first absolute coordinate value data stored into the storage to calculate second absolute coordinate value data showing coordinates of the mouse cursor of a movement destination; and a transmission step that transmits the calculated second absolute coordinate value data to an operating system.

With the above arrangement, the second absolute coordinate value data is transmitted to the operating system without new data being added, and hence the mouse cursor can be moved at a correct position by remote control without being affected by a movement speed or a movement acceleration of the mouse and the presence of software moving the mouse cursor.

The Present application is based on Japanese Patent Application Nos. 2007-302277 filed Nov. 21, 2007, and 2008-291570 filed Nov. 13, 2008, the entire disclosure of which is hereby incorporated by reference.

What is claimed is:

1. An information processing apparatus comprising:
a mouse driver that adds a second relative coordinate value data to a first relative coordinate value data showing a movement distance and a movement direction of a mouse cursor, and transmits the combined relative coordinate value data to an operating system;
an input portion that inputs the first relative coordinate value data from an external device via a KVM switch, and a flag showing effectiveness or invalidation of adding the second relative coordinate value data to the first relative coordinate value data; and
a controlling portion that transmits the first relative coordinate value data input to the input portion to the mouse driver, and when the flag shows invalidation of addition of the second relative coordinate value data, the controlling portion interrupting between the mouse driver and the operating system, acquiring the combined relative coordinate value data, removing the second relative coordinate value data from the combined relative coordinate value data, and transmitting the first relative coordinate value data to the operating system.

2. The information processing apparatus as claimed in claim 1, further comprising a transmission portion that transmits the first relative coordinate value data to the operating system without passing the mouse driver,
wherein when the flag shows invalidation of addition of the second relative coordinate value data, the controlling portion transmits the first relative coordinate value data to the transmission portion.

3. An information processing apparatus comprising:
an input portion that inputs absolute coordinate value data showing coordinates of a mouse cursor of a movement destination from an external device via a KVM switch;
a setting portion that sets a flag showing the absolute coordinate value data to the input absolute coordinate value data;
a determination portion that determines whether the flag shows the absolute coordinate value data; and
a transmission portion that transmits the absolute coordinate value data to an operating system when it is determined that the flag shows the absolute coordinate value data.

4. An information processing apparatus comprising:
a mouse driver that adds a second relative coordinate value data to a first relative coordinate value data showing a movement distance and a movement direction of a mouse cursor, and transmits the combined relative coordinate value data to an operating system;
an acquiring portion that acquires absolute coordinate value data showing coordinates of the mouse cursor after the mouse cursor is moved based on the combined relative coordinate value data; and a transfer portion that transfers the acquired absolute coordinate value data to an external device via a KVM switch.

5. An information processing apparatus comprising:

a storage that stores first absolute coordinate value data showing current coordinates of a mouse cursor;

an input portion that inputs relative coordinate value data showing a movement distance and a movement direction of the mouse cursor from an external device via a KVM switch;

a calculation portion that adds the relative coordinate value data input by the input portion to the first absolute coordinate value data stored into the storage to calculate second absolute coordinate value data showing coordinates of the mouse cursor of a movement destination; and a transmission portion that transmits the calculated second absolute coordinate value data to an operating system.

6. A remote system comprising:

a server including a mouse driver that adds a second relative coordinate value data to a first relative coordinate value data showing a movement distance and a movement direction of a mouse cursor, and transmits the combined relative coordinate value data to an operating system;

a KVM switch that is connected to the server; and a client that is connected to the KVM switch, displays screen data of the server, and directs operation to the server, the KVM switch including:

a reception portion that receives the first relative coordinate value data from the client; and a setting portion that sets a flag showing effectiveness or invalidation of adding the second relative coordinate value data to the first relative coordinate value data, and the server including:

an input portion that inputs the first relative coordinate value data and the flag from the KVM switch; and a controlling portion that transmits the first relative coordinate value data input to the input portion to the mouse driver, and when the flag shows invalidation of addition of the second relative coordinate value data, the controlling portion interrupting between the mouse driver and the operating system, acquiring the combined relative coordinate value data, removing the second relative coordinate value data from the combined relative coordinate value data, and transmitting the first relative coordinate value data to the operating system.

7. The remote system as claimed in claim 6, further comprising a transmission portion that transmits the first relative coordinate value data to the operating system without passing the mouse driver, wherein when the flag shows invalidation of addition of the second relative coordinate value data, the controlling portion transmits the first relative coordinate value data to the transmission portion.

8. A remote system comprising:

a server, a KVM switch connected to the server, and a client that is connected to the KVM switch, displays screen data of the server, and directs operation to the server, the KVM switch including:

a reception portion that receives absolute coordinate value data showing coordinates of a mouse cursor of a movement destination from the client; and a first transmission portion that transmits the absolute coordinate value data to the server, and the server including:

an input portion that inputs the absolute coordinate value data from the KVM switch;

a setting portion that sets a flag showing the absolute coordinate value data to the input absolute coordinate value data;

a determination portion that determines whether the flag shows the absolute coordinate value data; and a second transmission portion that transmits the absolute coordinate value data to an operating system when it is determined that the flag shows the absolute coordinate value data.

9. A remote system comprising:

a server including a mouse driver that adds a second relative coordinate value data to a first relative coordinate value data showing a movement distance and a movement direction of a mouse cursor, and transmits the combined relative coordinate value data to an operating system;

a KVM switch that is connected to the server; and a client that is connected to the KVM switch, displays screen data of the server, and directs operation to the server, the KVM switch including:

a reception portion that receives the first relative coordinate value data from the client; and a setting portion that sets a flag showing effectiveness or invalidation of adding the second relative coordinate value data to the first relative coordinate value data, the server including:

an input portion that inputs the flag showing effectiveness of adding the second relative coordinate value data to the first relative coordinate value data;

an acquiring portion that acquires absolute coordinate value data showing coordinates of the mouse cursor after the mouse cursor is moved based on the combined relative coordinate value data; and a transfer portion that transfers the acquired absolute coordinate value data to the client via the KVM switch, and the client including:

an adjusting portion that adjusts a position of the mouse cursor based on the absolute coordinate value data acquired from the server via the KVM switch.

10. A remote system comprising:

a server, an KVM switch connected to the server, and a client that is connected to the KVM switch, displays screen data of the server, and directs operation to the server, the KVM switch including:

a setting portion that sets an identification flag showing whether data input from the client or a mouse connected to the KVM switch is second absolute coordinate value data showing coordinates of a mouse cursor of a movement destination or relative coordinate value data showing a movement distance and a movement direction of the mouse cursor; and a first transmission portion that transmits the identification flag set by the setting portion, and the second absolute coordinate value data or the relative coordinate value data to the server, and the server including:

a storage that stores first absolute coordinate value data showing current coordinates of the mouse cursor;

an input portion that inputs the identification flag, and the second absolute coordinate value data or the relative coordinate value data;

a calculation portion that, when the identification flag shows that the data input from the client or the mouse connected to the KVM switch is the relative coordinate value data, adds the relative coordinate value data input by the input portion to the first absolute coordinate value data stored into the storage to calculate the second absolute coordinate value data; and a second transmission portion that transmits the calculated second absolute coordinate value data to an operating system of the server.

11. The remote system as claimed in claim 10, wherein when the identification flag shows that the data input from the client or the mouse connected to the KVM switch is the second absolute coordinate value data, the second transmission portion transmits the second absolute coordinate value data input by the input portion to the operating system of the server.

12. A computer readable non-transitory medium causing a computer to execute a process, the process comprising:

a mouse driving step that adds a second relative coordinate value data to a first relative coordinate value data showing a movement distance and a movement direction of a mouse cursor, and transmits the combined relative coordinate value data to an operating system;

an input step that inputs the first relative coordinate value data from an external device via a KVM switch, and a flag showing effectiveness or invalidation of adding the second relative coordinate value data to the first relative coordinate value data; and a controlling step that transmits the input first relative coordinate value data to the mouse driver, and when the flag shows invalidation of addition of the second relative coordinate value data, the controlling step interrupting between the mouse driver and the operating system, acquiring the combined relative coordinate value data, removing the second relative coordinate value data from the combined relative coordinate value data, and transmitting the first relative coordinate value data to the operating system.

13. The computer readable medium as claimed in claim 12, further comprising a transmission step that transmits the first relative coordinate value data to the operating system without passing the mouse driving step, wherein when the flag shows invalidation of addition of the second relative coordinate value data, the controlling step transmits the first relative coordinate value data to the transmission step.

14. A computer readable non-transitory medium causing a computer to execute a process, the process comprising:

an input step that inputs absolute coordinate value data showing coordinates of a mouse cursor of a movement destination from an external device via a KVM switch;

a setting step that sets a flag showing the absolute coordinate value data to the input absolute coordinate value data;

a determination step that determines whether the flag shows the absolute coordinate value data; and a transmission step that transmits the absolute coordinate value data to an operating system when it is determined that the flag shows the absolute coordinate value data.

15. A computer readable non-transitory medium causing a computer to execute a process, the process comprising:

a mouse driving step that adds a second relative coordinate value data to a first relative coordinate value data showing a movement distance and a movement direction of a mouse cursor, and transmits the combined relative coordinate value data to an operating system;

an acquiring step that acquires absolute coordinate value data showing coordinates of the mouse cursor after the mouse cursor is moved based on the combined relative coordinate value data; and a transfer step that transfers the acquired absolute coordinate value data to an external device via a KVM switch.

16. A computer readable non-transitory medium causing a computer to execute a process, the process comprising:

a storing step that stores first absolute coordinate value data showing current coordinates of a mouse cursor into a storage;

an input step that inputs relative coordinate value data showing a movement distance and a movement direction of the mouse cursor from an external device via a KVM switch;

a calculation portion that adds the relative coordinate value data input by the input portion to the first absolute coordinate value data stored into the storage to calculate second absolute coordinate value data showing coordinates of the mouse cursor of a movement destination; and a transmission step that transmits the calculated second absolute coordinate value data to an operating system.

* * * * *